(12) United States Patent
Nabetani

(10) Patent No.: US 10,171,148 B2
(45) Date of Patent: Jan. 1, 2019

(54) WIRELESS COMMUNICATION DEVICE

(71) Applicant: KABUSHIKI KAISHA TOSHIBA, Minato-ku, Tokyo (JP)

(72) Inventor: Toshihisa Nabetani, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/395,378

(22) Filed: Dec. 30, 2016

(65) Prior Publication Data

US 2017/0111096 A1    Apr. 20, 2017

Related U.S. Application Data

(63) Continuation of application No. PCT/JP2015/076273, filed on Sep. 16, 2015.

(30) Foreign Application Priority Data

Sep. 30, 2014    (JP) ................................. 2014-202633

(51) Int. Cl.
*H04B 7/06* (2006.01)
*H04W 28/04* (2009.01)
(Continued)

(52) U.S. Cl.
CPC ............ *H04B 7/0617* (2013.01); *H04B 7/04* (2013.01); *H04B 7/0697* (2013.01); *H04L 1/18* (2013.01);
(Continued)

(58) Field of Classification Search
CPC ........................... H04B 7/0617; H04B 7/0697
See application file for complete search history.

(56) References Cited

U.S. PATENT DOCUMENTS

| 6,667,990 B1* | 12/2003 | Arao ....................... H04J 3/085 370/465 |
| 2004/0157635 A1* | 8/2004 | Park ....................... H04L 1/0026 455/522 |

(Continued)

FOREIGN PATENT DOCUMENTS

| JP | 2004-328570 A | 11/2004 |
| JP | 2007-208522 A | 8/2007 |

(Continued)

OTHER PUBLICATIONS

Morioka, "SMDA Operation Within 802.11", IEEE 802.11-09/0532r0, Sony Corporation, May 2009, pp. 1-16.*
(Continued)

*Primary Examiner* — Ross Varndell
(74) *Attorney, Agent, or Firm* — Foley & Lardner LLP

(57) ABSTRACT

According to one embodiment, a wireless communication device includes a transmitter configured to multiplex and transmit a plurality of first frames; a receiver configured to receive a plurality of second frames that represent acknowledgement responses to the plurality of first frames and are multiplexed and transmitted; and controlling circuitry. The first information necessary for transmission of the plurality of second frames is set in the plurality of first frames. The controlling circuitry is configured to separate the plurality of second frames based on the first information.

14 Claims, 21 Drawing Sheets

(51) Int. Cl.

| | | |
|---|---|---|
| *H04B 7/04* | (2017.01) | |
| *H04W 16/28* | (2009.01) | |
| *H04W 84/12* | (2009.01) | |
| *H04L 1/18* | (2006.01) | |
| *H04L 5/00* | (2006.01) | |

(52) U.S. Cl.
CPC ............... *H04L 5/00* (2013.01); *H04W 16/28* (2013.01); *H04W 28/04* (2013.01); *H04W 84/12* (2013.01)

(56) References Cited

U.S. PATENT DOCUMENTS

| | | |
|---|---|---|
| 2005/0002355 A1 | 1/2005 | Takano |
| 2010/0202347 A1 | 8/2010 | Sridhara et al. |
| 2014/0092854 A1* | 4/2014 | Sonobe ............... H04L 5/08 370/329 |
| 2016/0309478 A1 | 10/2016 | Nabetani et al. |
| 2017/0006612 A1 | 1/2017 | Nabetani et al. |

FOREIGN PATENT DOCUMENTS

| | | |
|---|---|---|
| JP | 2012-517780 A | 8/2012 |
| WO | WO-2015/099202 A1 | 7/2015 |

OTHER PUBLICATIONS

Madhavan, Narendar: "Reducing Channel Sounding Protocol Overhead for 11ax", IEEE 11-15-1097-01-00ax-reducing-channel-sounding-protocol-overhead-for-11ax, Toshiba, Sep. 2015, pp. 1-16.

Stacey, Robert: "Specification Framework for TGax", IEEE 11-15-0132-17-00ax-spec-framework, Intel, May 2016, pp. 1-61.

Adachi, Tomoko: "Regarding Trigger Frame in UL MU", IEEE 802.11-15/0608r1, Toshiba, May 2015, pp. 1-16.

Chu et al.: "Acknowledgement to DL MU", IEEE 802.11-15/1123r1, Marvell, Sep. 2015, pp. 1-14.

Chu et al.: "Broadcast and Unicast (Trigger) in DL MU", IEEE 802.11-15/0831r2, Marvell, Jul. 2015, pp. 1-16.

Chun et al.: "Consideration on UL MU Transmission", IEEE 11-14/0802r0, LG Electronics, Jul. 2014, pp. 1-10.

Fang et al.: "MU Synchronization Requirements for SFD", IEEE 802.11-15/0363r1, ZTE, Mar. 2015, pp. 1-9.

Fang et al.: "UL MU Random Access Analysis", IEEE 802.11-15/0843r1, ZTE, Jul. 2015, pp. 1-20.

Hedayat et al.: "DL OFDMA Performance and ACK Multiplexing", IEEE 802.11-15/379r1, Newracom, Mar. 2015, pp. 1-13.

Hedayat et al.: "Uplink ACK and BA Multiplexing", IEEE 802.11-15/0587r0, Newracom, May 2015, pp. 1-11.

Hedayat et al.: "Uplink ACK and BA Multiplexing", IEEE 802.11-15/0829r3, Newracom, Jul. 2015, pp. 1-21.

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11 ac™, The Institute of Electrical and Electronics Engineers, Inc., Dec. 2013, pp. 1-425.

Kwon et al.: "Bandwidth for UL MU Transmission", IEEE 802.11-15/1052r0, Newracom, Sep. 2015, pp. 1-13.

Lee et al.: "LTF Design for Uplink MU-MIMO", IEEE 802.11-15/0845r0, Newracom, Jul. 2015, pp. 1-18.

Lee et al.: "LTF Design for Uplink MU-MIMO", IEEE 802.11-15/1088r0, Newracom, Sep. 2015, pp. 1-28.

Li et al.: "HE-LTF Sequence for UL MU-MIMO", IEEE 802.11-15/0602r6, Intel, Sep. 2015, pp. 1-33.

Lv et al.: "Frame Exchange Control for Uplink Multi-User Transmission", IEEE 802.11-14/1190r3, ZTE, Sep. 2014, pp. 1-12.

Madhavan et al.: "ACK/BA Frame for UL MU Under Cascading Structure", IEEE 802.11-15/1098r1, Toshiba, Sep. 2015, pp. 1-11.

Merlin et al.: "Trigger Frame Format", IEEE 802.11-15/0877r1, Qualcomm, Jul. 2015, pp. 1-15.

Morioka, Yuichi: "[SDMA Operation Within 802.11]", IEEE 802.11-09/0532r0 [as understood], Sony Corporation, May 2009, pp. 1-16.

Ryu et al.: "UL MU Procedure", IEEE 802.11-15/0365r0, LG Electronics, Mar. 2015, pp. 1-16.

Seok et al.: "Uplink Multi-User MIMO Protocol Design", IEEE 802.11-15/0331r0, Newracom, Mar. 2015, pp. 1-11.

Son et al.: "HE Trigger Frame Format", IEEE 802.11-15/0851r0, WILUS Institute, Jul. 2015, pp. 1-10.

Stacey, Robert: "Specification Framework for TGax", IEEE 802.11-15/0132r9, Intel, Sep. 2015, pp. 1-22.

Yang et al.: "Cascading Structure", IEEE 802.11-15/0841r1, Huawei, Jul. 2015, pp. 1-21.

* cited by examiner

WIRELESS COMMUNICATION DEVICE

CROSS REFERENCE TO RELATED APPLICATIONS

This application is a Continuation of International Application No. PCT/JP2015/076273, filed on Sep. 16, 2015, the entire contents of which is hereby incorporated by reference.

FIELD

Embodiments of the present invention relate to a wireless communication device.

BACKGROUND

As a wireless communication system in which a wireless access point and a wireless terminal communicate with each other, the wireless local area network (LAN) that adopts carrier sense multiple access/collision avoidance (CSMA/CA) is widely known. In the wireless LAN technology, the downlink multiuser MIMO (DL-MU-MIMO) technique, an extension of the Multi-Input Multi-Output (MIMO) technique, is known. In the downlink multiuser MIMO, a technology called beamforming is used, which allows an access point to perform data transmission to wireless terminals with beams spatially orthogonal to one another. Therefore, different pieces of data can be transmitted to a plurality of wireless terminals simultaneously. Each wireless terminal having been received the piece of data notifies, to the access point, whether the piece of data has been received without error (acknowledgement response), and issues a retransmission request for data that has not been successfully received.

The wireless terminals having received data transmit acknowledgement response frames to the access point in turns while shifting a time. Therefore, an overhead occurs by the number of terminals, which hinders the achievement of a high throughput.

DETAILED DESCRIPTION

According to one embodiment, a wireless communication device includes a transmitter configured to multiplex and transmit a plurality of first frames; a receiver configured to receive a plurality of second frames that represent acknowledgement responses to the plurality of first frames and are multiplexed and transmitted; and controlling circuitry. The first information necessary for transmission of the plurality of second frames is set in the plurality of first frames. The controlling circuitry is configured to separate the plurality of second frames based on the first information.

Hereinafter, embodiments of the present invention will be described with reference to the drawings. The entire contents of IEEE Std 802.11™-2012 and IEEE Std 802.11ac™-2013, known as the wireless LAN specification are herein incorporated by reference in the present specification.

First Embodiment

Figure 1:
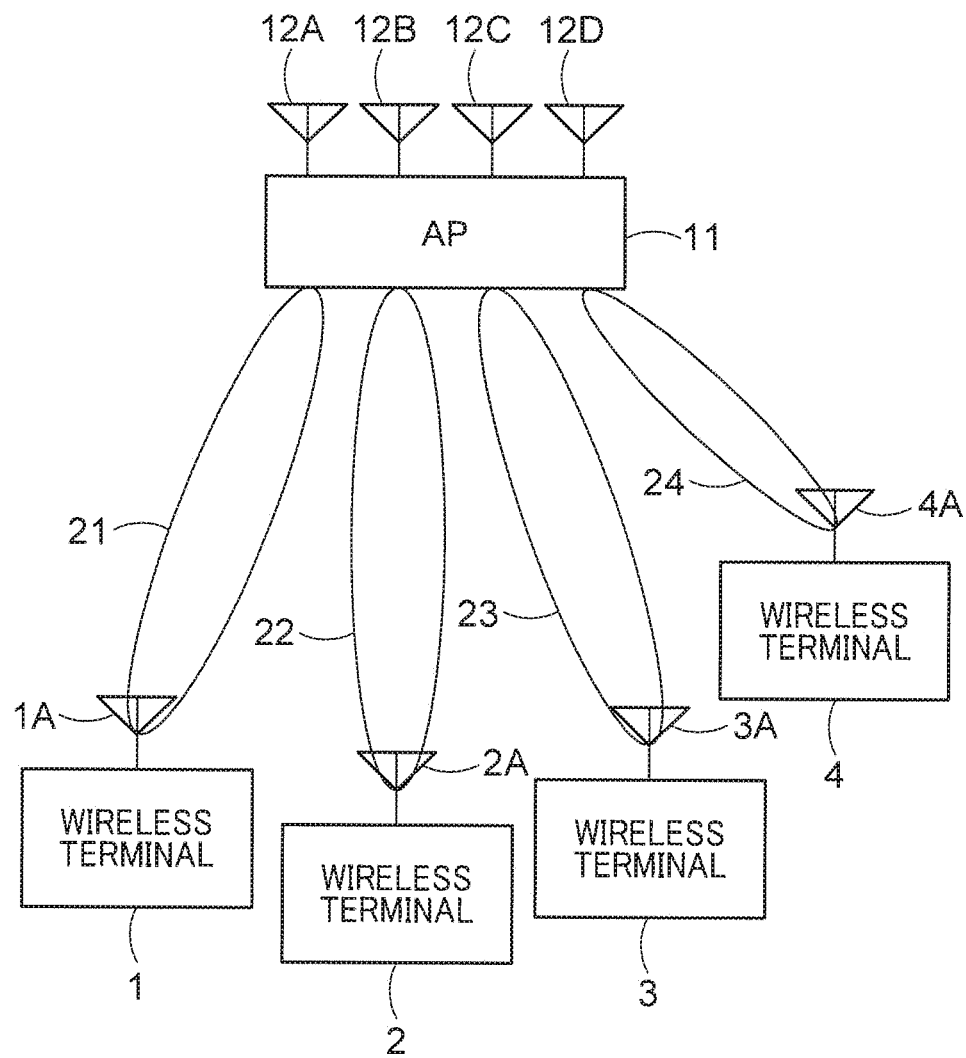
FIG. 1 is a diagram illustrating a wireless communication system according to a first embodiment.

FIG. 1 shows a wireless communication system according to a first embodiment.

The wireless communication system of FIG. 1 is a wireless network including an access point (AP) 11 and a plurality of wireless terminals (stations) 1, 2, 3, and 4. The access point 11 is one form of a wireless terminal. The access point 11 and the wireless terminals 1 to 4 perform wireless communication based on any wireless communication method. As one example, the access point 11 and the wireless terminals 1 to 4 perform the wireless communication based on the IEEE 802.11 standard. Although the following description will be mainly made assuming that a wireless LAN complies with the IEEE 802.11 standard, the present embodiment is not limited thereto.

The access point 11 includes a plurality of antennas. In the example of FIG. 1, the access point 11 includes four antennas 12A, 12B, 12C, and 12D. The wireless terminals 1 to 4 each include one or more antennas. In the example of FIG. 1, the wireless terminals 1 to 4 include one antenna 1A, 2A, 3A, and 4A, respectively.

The access point 11 transmits the frames addressed to the wireless terminals 1 to 4 to the wireless terminals 1 to 4 by spatial multiplexing. The transmission by spatial multiplexing means that a plurality of frames are transmitted at the same time in the same frequency band. Specifically, the access point 11 transmits the frames addressed to the wireless terminals in the downlink multiuser MIMO. The downlink multiuser MIMO transmission can increase the throughput.

To perform the downlink multiuser MIMO transmission, the access point 11 obtains in advance channel information that represents a state of the channels of downlinks from the antennas 12A to 12D to the wireless terminals 1 to 4, from the wireless terminals 1 to 4. The access point 11 calculates a directional beam pattern on the basis of the pieces of channel information obtained from the wireless terminals, in such a manner as to suppress interference among signals addressed to the plurality of the wireless terminals 1 to 4. The access point 11 forms beams 21, 22, 23, and 24 in conformity with such a directional beam pattern. The data frames addressed to the wireless terminals are thereby transmitted. In such a manner, the access point 11 can transmit data frames to the wireless terminals at the same time in the same frequency band. That is, the downlink multiuser MIMO transmission is possible.

Each wireless terminal that has received data by the downlink multiuser MIMO transmission transmits an acknowledgement response frame such as an acknowledgement (ACK) frame and a BlockAck (BA) frame, to an access point 11. Here, wireless terminals 1 to 4 in the present embodiment transmit acknowledgement response frames in the uplink multiuser MIMO (UL-MU-MIMO) technique. That is, the wireless terminals 1 to 4 simultaneously transmit BA frames to the access point 11 using the same frequency band.

Figure 2:
FIG. 2 is a diagram schematically illustrating how to transmit BA frames in uplink multiuser MIMO.

FIG. 2 is a diagram schematically illustrating how the wireless terminals 1 to 4 performs the uplink multiuser MIMO transmission on BA frames to the access point 11. Signals (frames) transmitted by the access point 11 and the wireless terminals are shown as rectangles. The horizontal axis is a time axis, and a right direction thereof along the drawing is a direction of time passage. In the present embodiment, description will be made about a method in which a BA frame is used as an acknowledgement response frame, and the same holds true for the case of using an ACK frame.

The access point 11 establishes in advance wireless links with a plurality of wireless terminals including the wireless terminals 1 to 4. In addition, the access point 11 acquires in advance, from the wireless terminals 1 to 4, propagation channel information on downlinks from antennas 12A to 12D to the wireless terminals 1 to 4. Then, the access point 11 transmits data for the wireless terminals 1 to 4 retained in a buffer in the form of data frames 601 to 604 in the downlink multiuser MIMO. The data frames 601 to 604 may each be an aggregated frame, which is the aggregation of one or more data frames. An aggregated frame includes a plurality of frames coupled to each other with delimiters interposed therebetween, and on a receiving side, the frames can be separated by the delimiters. Although it is assumed here that an aggregated frame is the aggregation of a plurality of data frames, the aggregation of frames may be the mixture of a plurality of types of frames such as a data frame and a management frame. The frame types such as data frame and management frame will be described in detail in another embodiment. The wireless terminals 1 to 4 having received the data frames 601 to 604 each check the cyclic redundancy code (CRC) of the received data frame and examine whether the data frame has been received without error. Then, after a time period T1 from the downlink multiuser MIMO transmission, the wireless terminals 1 to 4 transmits BA frames 611 to 614, which are acknowledgement response frames, to the access point 11 in the uplink multiuser MIMO transmission. The time period T1 may be any value as long as it is a predetermined certain period of time. As one example, a SIFS (Short Inter-frame Space) time (=16 μs), which is a time interval between frames regulated in the MAC protocol specification of the IEEE 802.11 wireless LAN or a longer time period can be used.

Since the access point 11 receives the BA frames 611 to 614 transmitted from the wireless terminals using the same frequency band in the uplink multiuser MIMO, these BA frames need to be spatially separated. Thus, the access point 11 transmits in advance information necessary to spatially separate the BA frames (spatial separation information) to the wireless terminals 1 to 4. In the present embodiment, the access point 11 transmits, to the wireless terminals 1 to 4, information on preamble patterns (bit strings) that are orthogonal to one another, as spatial separation information. Then, the wireless terminals 1 to 4 store the preamble patterns (bit strings) orthogonal from each other between the wireless terminals, in preamble fields of the respective BA frames to be transmitted from themselves. The access point 11 grasps in advance the preamble patterns of the respective BA frames, and using these preamble patterns, estimates uplink propagation channel responses from the respective wireless terminals to the access point 11.

For example, the access point 11 estimates channel response matrices (channel response matrices of the uplinks) from the antennas of the wireless terminals to the antennas of the access point. The access point correctly separates fields (e.g., data field) subsequent to the preambles in the BA frames received from the wireless terminals by using the estimated channel response matrices of the uplinks. This can be done by using any well-known methods such as the ZF (Zero-Forcing) method, the MMSE (Minimum Mean Square Error) method, and the maximum likelihood estimation method.

Now, description will be made about how the access point 11 transmits the spatial separation information to the wireless terminals 1 to 4. The access point 11 in the present embodiment transmits, to the wireless terminals 1 to 4, the spatial separation information using a MAC header or a PHY header of the data frames 601 to 604 used to transmit in the downlink multiuser MIMO.

Transmission of Spatial Separation Information Using MAC Header

First, description will be made about how the access point 11 transmits the spatial separation information using a MAC header.

Figure 3:
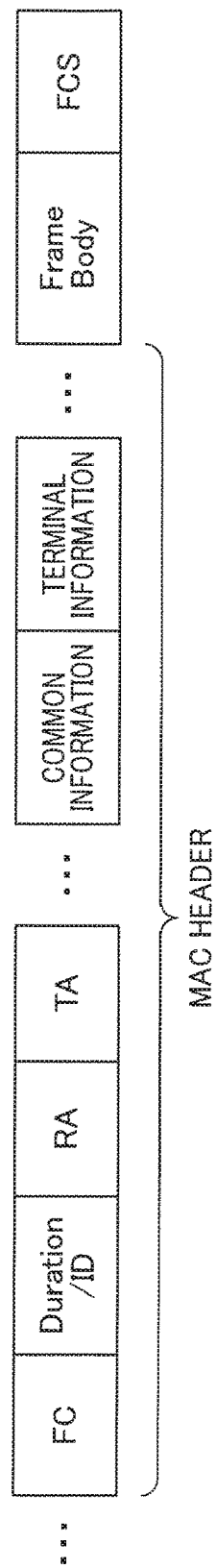
FIG. 3 is a diagram illustrating an example of a frame format of a MAC header.

FIG. 3 illustrates an example of a data frame to be transmitted to each wireless terminal by the access point 11.

This data frame includes a frame control (FC) field, a duration/ID field, a receiver address (RA) field, a transmitter address (TA) field, a common information field, a terminal information field, a frame body field, and a frame check sequence (FCS) field.

In the FC field, information indicating the type of the frame or the like is stored.

In the duration/ID field, a time to be set as a virtual carrier sense is a stored.

In the RA field, the MAC address of the transmission destination of the frame is stored. In the data frame 601 addressed to the wireless terminal 1, the MAC address of the wireless terminal 1 is stored.

In the TA field, the MAC address of the transmission source of the frame is stored. In the present embodiment, the MAC address of the access point 11 is stored.

In the common information field, information to be notified to the wireless terminals 1 to 4 in common is stored as the spatial separation information.

In the terminal information field, information to be notified to an individual wireless terminal is stored as the spatial separation information.

In the frame body field, a data body to be transmitted to an individual wireless terminal by the access point 11 is stored.

In the FCS field, FCS information on the data frame in question is stored. The FCS information is used for frame error detection performed on the side of a wireless terminal that receives the data frame.

Description will be made about the spatial separation information that is notified by the access point 11 using the common information field and the terminal information field.

As the spatial separation information, for example, the access point 11 transmits an orthogonal matrix so that the wireless terminals perform the uplink multiuser MIMO transmission using preamble patterns orthogonal to one another. Examples of the orthogonal matrix are illustrated below.

[Expression 1]

$$\begin{bmatrix} 1 & -1 \\ 1 & 1 \end{bmatrix} \quad (1)$$

[Expression 2]

$$\begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad (2)$$

A matrix (1) is an example of the orthogonal matrix in the case where the spatial multiplexing number is two (i.e., a 2×2 matrix). A matrix (2) is an example of the orthogonal matrix in the case where the spatial multiplexing number is four (corresponding to the example of FIG. 1) (i.e., a 4×4 matrix). The orthogonal matrix has a characteristic in that row (or column) vectors represented by respective rows (or columns) are orthogonal to one another. The orthogonality of vectors means that their inner product is zero. In addition, the spatial multiplexing number refers to the number of the data streams to be spatially multiplexed.

The access point 11 uses the common information field to transmit the orthogonal matrix to the wireless terminals 1 to 4. Here, the access point 11 may be configured to transmit an orthogonal matrix in conformity to the number of streams in the uplink multiuser MIMO transmission performed by the wireless terminals 1 to 4. In the case illustrated in FIG. 2, the total number of streams in the uplink multiuser MIMO is four, and thus the number of four and an orthogonal matrix of the matrix (2) is stored in the common information field.

In order for the wireless terminals 1 to 4 to transmit the preamble patterns orthogonal to one another, it is necessary to specify the preamble patterns to be used by the respective wireless terminals, in the terminal information field. As an example of specifying the preamble patterns, a row number (or a column number) of the orthogonal matrix can be used. For example, a row number (or a column number) used by the wireless terminal 1 is stored in the terminal information field of a data frame to be transmitted to the wireless terminal 1. Based on the row (or column) indicated with the number stored in the terminal information field, the wireless terminal 1 can identify the preamble pattern to use.

In the case where the value of the matrix is defined in the IEEE 802.11 standard, and the value is stored in internal memories of the access point 11 and the wireless terminals 1 to 4, the access point 11 may transmit the total number of streams using the common information field. By referring to the specified total number of streams from the access point 11, the wireless terminals 1 to 4 can read the respective matrices stored in their internal memories.

In addition, the terminal information field may include spatial separation information to be used by other wireless terminals. For example, the terminal information field of a data frame transmitted to be the wireless terminal 1 may include information on a preamble pattern to be used by the wireless terminal 1 as well as information on preamble patterns to be used by the wireless terminals 2 to 4. In addition, a plurality of terminal information fields with identifiers of the wireless terminals may be provided, for example, the terminal information field for the wireless terminal 1, the terminal information field for the wireless terminal 2, and the like.

Note that the frame format illustrated in FIG. 3 is merely an example, and other formats may be used. For example, the common information field and the terminal information field may be interchanged, or positions into which these fields are inserted may be interchanged. A different field into which the common information field and the terminal information field are integrated may be provided. In addition, the spatial separation information may be stored in a reserved area of another field.

Transmission of Spatial Separation Information Using PHY Header

Next, description will be made about how the access point 11 transmits the spatial separation information using the PHY headers of the data frames 601 to 604.

Figure 4:
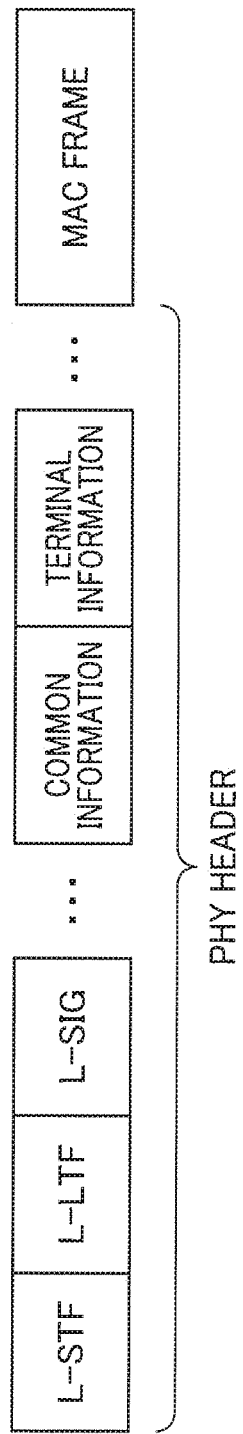
FIG. 4 is a diagram illustrating an example of a frame format of a PHY header.

FIG. 4 illustrates an example of the PHY header of a data frame to be transmitted to the wireless terminals 1 to 4 by the access point 11.

The PHY header includes an L-STF (Legacy-Short Training Field), an L-LTF (Legacy-Long Training Field), an L-SIG (Legacy Signal Field), the common information field, and the terminal information field.

The L-STF, L-LTF, and L-SIG are, for example, a field that can be recognized in legacy standards such as the IEEE802.11a, and contain information on signal detection, frequency correction, transmission rate, and the like.

In the common information field and the terminal information field, information to be notified to the wireless terminals 1 to 4 in common and information to be notified to each wireless terminal are stored, respectively, as the spatial separation information, as in the aforementioned notification with a MAC header. In addition, the access point 11 may store the spatial separation information in the common information field and the terminal information field, being associated with a Group ID and a user's position, which are specified to implement the downlink multiuser MIMO transmission on the IEEE 802.11ac standard.

At the time of transmitting the data frames 601 to 604 to the wireless terminals 1 to 4 in the downlink multiuser MIMO, the access point 11 may transmit fields from an L-STF up to the common information field without beamforming and transmit fields including the terminal information field and subsequent fields with beamforming. That is, it is possible to transmit the fields including the same information addressed to the wireless terminals 1 to 4 without beamforming. In the transmission without beamforming, the number of antennas used may be one or more.

Note that the frame format illustrated in FIG. 4 is merely an example, and other formats may be used. For example, the common information field and the terminal information field may be interchanged, or positions into which these fields are inserted may be interchanged. A different field into which the common information field and the terminal information field are integrated may be provided. In addition, the spatial separation information may be stored in a reserved area of another field.

Transmission of BA Frame in Uplink Multiuser MIMO

Next, description will be made about how the wireless terminals 1 to 4 transmit the BA frames 611 to 614 to the access point 11 in the uplink multiuser MIMO.

The wireless terminals 1 to 4 each check the CRC of a data frame received from the access point 11 to examine whether the data frame has been received without error. Then, after a lapse of the given amount of time T1, the wireless terminals 1 to 4 each transmit a BA frame, an acknowledgement response frame, to the access point 11 in the uplink multiuser MIMO. At this point, each wireless terminal refers to the spatial separation information notified from the access point 11 to select a preamble pattern (bit string) to be set to the preamble field of the BA frame.

Figure 5:
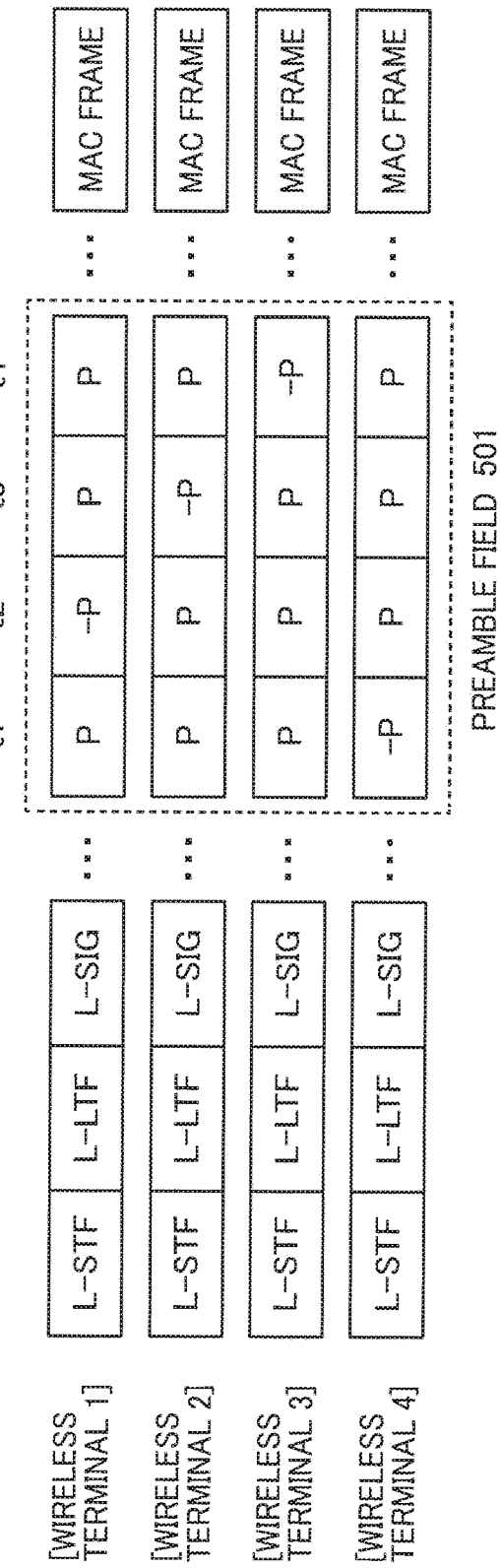
FIG. 5 is a diagram illustrating a schematic configuration example of BA frames transmitted in the uplink multiuser MIMO.

FIG. 5 illustrates an example of the BA frames 611 to 614 (more specifically, PHY packets including the BA frames) to be transmitted by the wireless terminals 1 to 4.

In each MAC frames illustrated in FIG. 5, the CRC result of the data frame received from the access point 11 is stored, using a starting sequence number and a bitmap. In addition, in accordance with a transmission destination and a transmission source, the values of an RA field and a TA field are set.

In a preamble field 501, preamble patterns (bit strings) generated using the orthogonal matrix are stored. It is assumed in this example that, based on the spatial separation information notified from the access point 11, the first row of the matrix (2) is specified for the wireless terminal 1, the second row of the matrix (2) is specified for the wireless terminal 2, the third row of the matrix (2) is specified for the wireless terminal 3, the fourth row of the matrix (2) is specified for the wireless terminal 4, as the preamble patterns.

The preamble field 501 is formed of a plurality of segments, and each segment contains "P" or "-P" disposed in accordance with a value of the corresponding row in the orthogonal matrix along a direction of the frame. One segment corresponds to at least one modulation symbol. In addition, one segment corresponds to a symbol period. Any method such as BPSK, QPSK, and QAM may be used for a method of modulating a symbol. The "P" and "-P" are elements each consisting of a bit stream having a length of one bit or more. As one example, the modulation symbol of the bit stream P and the modulation symbol of the bit stream -P are in a relation of the same amplitude and a phase difference of 180 degrees (a relation in which they cancel out each other).

The preamble pattern of the wireless terminal 1 is [P, -P, P, P], which corresponds to [1, -1, 1, 1] of the first row of the matrix (2). Likewise, the preamble pattern of the wireless terminal 2 is [P, P, -P, P], which corresponds to [1, 1, -1, 1] of the second row in the matrix (2). The preamble pattern of the wireless terminal 3 is [P, P, P, -P], which corresponds to [1, 1, 1, -1] of the third row in the matrix (2). The preamble pattern of the wireless terminal 4 is [-P, P, P, P], which corresponds to [-1, 1, 1, 1] of the fourth row in the matrix (2). The preamble patterns are orthogonal to one another between the wireless terminals.

Reference characters "t1", "t2", "t3", and "t4" in FIG. 5 represent timings at which the bit stream (P or -P) of each segment in the preamble pattern is transmitted. For example, at the timing t1, the bit stream P of the first segment in the preamble pattern of the wireless terminal 1 is transmitted in the form of a modulation symbol according to the modulation method (a first modulation symbol). Likewise, the bit strings P of the first segments in the preamble patterns of the wireless terminal 2 and the wireless terminal 3 are transmitted. Furthermore, the bit string -P of the first segment in the preamble pattern of the wireless terminal 4 is transmitted in the form of a modulation symbol according to the modulation method (a second modulation symbol, e.g., a symbol having the same amplitude and having the opposite phase as those of the first modulation symbol).

As seen from the above, each wireless terminal configures a preamble pattern based on one of different rows (or columns) in the orthogonal matrix in proportion to the spatial number of multiplexing (the number of streams), which enables the configuration of the preamble patterns orthogonal to one another. That is, while receiving the signals of the preamble patterns at the same time in a multiplexed state from the wireless terminals, the access point 11 can estimate the propagation channel response matrix (the propagation channel response matrix of the uplinks) because the preamble patterns are orthogonal to one another.

Note that the frame format illustrated in FIG. 5 is merely an example, and other formats may be used. For example, the preamble pattern may be stored in a reserved area of another field.

Reception of BA Frames by Access Point 11

Next, description will be made about how the access point 11 estimates uplink propagation channel responses from the wireless terminals 1 to 4 to the access point 11 based on the preamble fields 501 of the BA frames.

Figure 6:
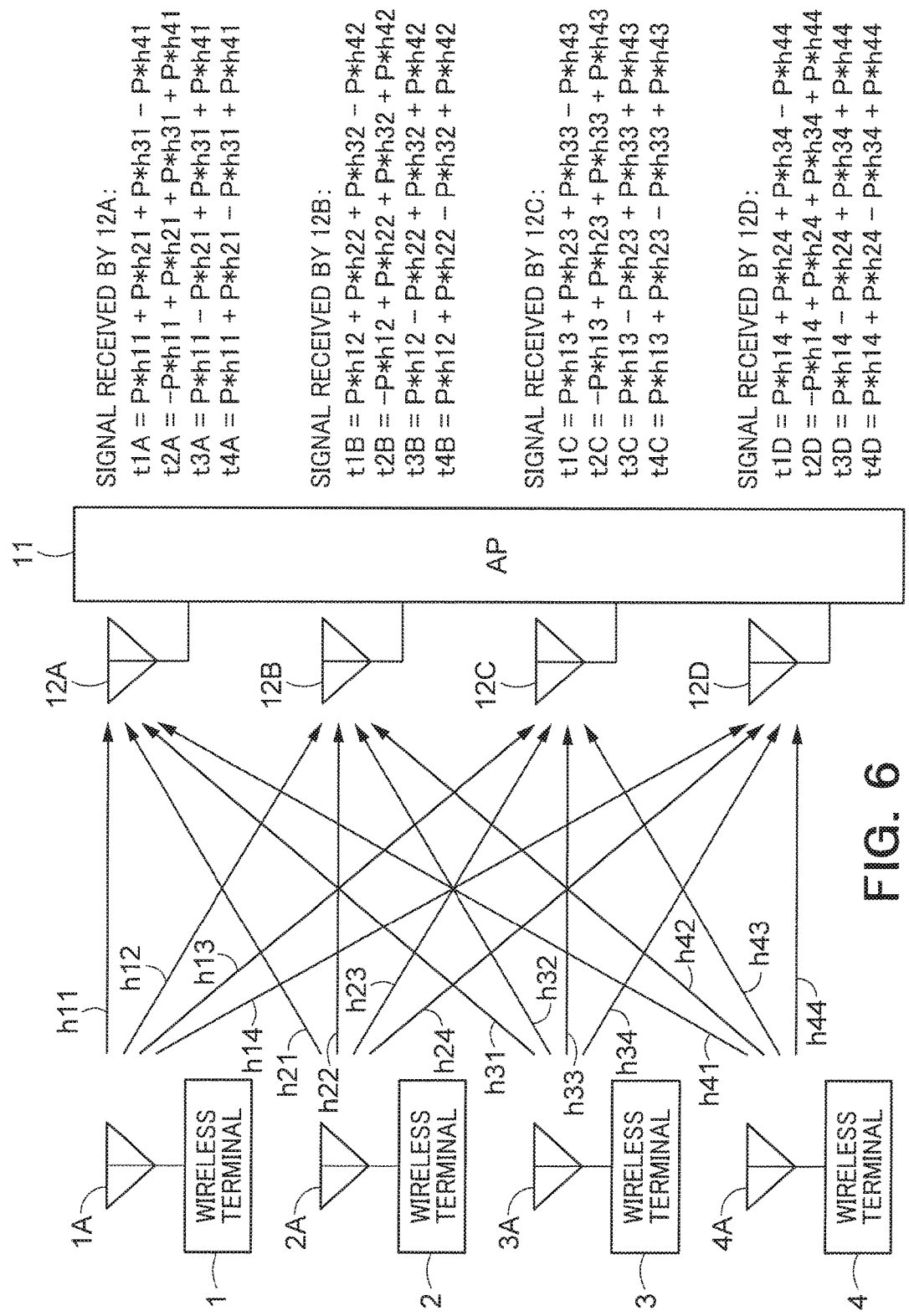
FIG. 6 is a diagram illustrating how to estimate uplink propagation channel responses.

As illustrated in FIG. 6, the propagation channel responses in the uplinks from antennas 1A to 4A of the wireless terminals 1 to 4 to antennas 12A to 12D of the access point 11 are denoted by h11 to h14, h21 to h24, h31 to h34, and h41 to h44, respectively.

At the timing t1 illustrated in FIG. 5, in the first segments in the preamble patterns, the bit string "P" is transmitted in the form of the first modulation symbol or the bit string "−P" is transmitted in the form of the second modulation symbol, from the antennas 1A to 4A of the respective four wireless terminals 1 to 4. Experiencing the influence of the propagation channel response h11 to the antenna 12A of the access point 11, the propagation channel response h12 to the antenna 12B, the propagation channel response h13 to the antenna 12C, and the propagation channel response h14 to the antenna 12D, the first modulation symbol signal of "P" transmitted from the antenna 1A of the wireless terminal 1 is received by the antennas 12A to 12D. Likewise, experiencing the influence of propagation channel responses, the first modulation symbol signal transmitted from the antennas 2A and 3A of the wireless terminals 2 and 3 and the second modulation symbol signal transmitted from the antenna 4A of the wireless terminal 4 are received by the antennas 12A to 12D of the access point 11.

Consequently, at the timing t1, the signal received by the antenna 12A of the access point 11 can be expressed as t1A=P*h11+P*h21+P*h31−P*h41, the signal received by the antenna 12B can be expressed as t1B=P*h12+P*h22+P*h32−P*h42, the signal received by the antenna 12C can be expressed as t1C=P*h13+P*h23+P*h33−P*h43, and the signal received by the antenna 12D can be expressed as t1D=P*h14+P*h24+P*h34−P*h44.

Likewise, at the timing t2, the signal received by the antenna 12A of the access point 11 can be expressed as t2A=−P*h11+P*h21+P*h31+P*h41, the signal received by the antenna 12B can be expressed as t2B=−P*h12+P*h22+P*h32+P*h42, the signal received by the antenna 12C can be expressed as t2C=−P*h13+P*h23+P*h33+P*h43, and the signal received by the antenna 12D can be expressed as t2D=−P*h14+P*h24+P*h34+P*h44.

At the timing t3, the signal received by the antenna 12A of the access point 11 can be expressed as t3A=P*h11−P*h21+P*h31+P*h41, the signal received by the antenna 12B can be expressed as t3B=P*h12−P*h22+P*h32+P*h42, the signal received by the antenna 12C can be expressed as t3C=P*h13−P*h23+P*h33+P*h43, and the signal received by the antenna 12D can be expressed as t3D=P*h14−P*h24+P*h34+P*h44.

At the timing t4, the signal received by the antenna 12A of the access point 11 can be expressed as t4A=P*h11+P*h21−P*h31+P*h41, the signal received by the antenna 12B can be expressed as t4B=P*h12+P*h22−P*h32+P*h42, the signal received by the antenna 12C can be expressed as t4C=P*h13+P*h23−P*h33+P*h43, and the signal received by the antenna 12D can be expressed as t4D=P*h14+P*h24−P*h34+P*h44.

The access point 11 can determine the propagation channel responses h11, h21, h31, and h41 by performing addition or subtraction on the signals t1A, t2A, t3A, and t4A received by the antenna 12A. For example, as to h11, by calculating t1A−t2A+t3A+t4A, h11 is determined as h11=(t1A−t2A+t3A+t4A)/4P. Since "P" is a known signal, and the received signals t1A, t2A, t3A, and t4A are measurable, h11 can be determined. Likewise, as to h21, h31, and h41, by performing the addition or subtraction on the received signals t1A, t2A, t3A, and t4A, h21, h31, and h41 can be determined.

The access point 11 can also determine the other propagation channel responses by performing the addition or subtraction the signals received by the antennas 12B to 12D. For example, as to h44, by calculating −t1D+t2D+t3D+t4D, h44 can be determined as h44=(−t1D+t2D+t3D+t4D)/4P.

Based on the propagation channel responses h11 to h14, h21 to h24, h31 to h34, and h41 to h44 calculated in the above-described manner, the access point 11 can obtain a propagation channel response matrix (propagation channel response matrix of the uplinks) expressed by the following expression (3).

[Expression 3]

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \quad (3)$$

By using this propagation channel response matrix (propagation channel response matrix of the uplinks), four data streams transmitted from the antennas 1A to 4A of the wireless terminals 1 to 4 can be separated. That is, the access point 11 can spatially separate data disposed subsequent to the preamble fields 501 in the BA frames received from the wireless terminals 1 to 4.

Also in the case where the spatial number of multiplexing is not four, the propagation channel response matrix of the uplinks can be estimated on an access point 11 side, by the allocation of preamble patterns orthogonal to one another to the wireless terminals using the orthogonal matrix corresponding to the spatial number of multiplexing. For example, in the case where the spatial number of multiplexing is two, preamble patterns configured by wireless terminals using the matrix (1) allow the access point 11 to estimate a propagation channel response matrix of uplinks.

Here, to correctly estimate the channel response matrix (channel response matrix of the uplinks), the wireless terminals need to ensure the use of the orthogonal preamble patterns. Supposing that two or more of the wireless terminals use the preamble patterns based on the same row (or column) of the orthogonal matrix, the patterns of the preambles received at the access point are not orthogonal to one another, and the correct channel response matrix (the channel response matrix of the uplinks) cannot be therefore obtained. In the case of an ordinal MIMO transmission, rather than the multiuser MIMO transmission, a plurality of streams are transmitted by one wireless terminal including a plurality of antennas, which allows the wireless terminal that performs the MIMO transmission to apply different patterns to streams to be transmitted at its own discretion. In the case of the uplink multiuser MIMO, however, since different wireless terminals transmit the streams, each wireless terminal cannot detect which row (or column) of the orthogonal matrix the pattern used by the other wireless terminal is based on.

Hence, in the present embodiment, the access point 11 determines the preamble patterns used by the wireless terminals, making them different from one another, and notifies of information on the preamble patterns that the wireless terminals should use (space separation information), in the common information field and the terminal information fields of the data frames 601 to 604. It is thereby possible to ensure that the wireless terminals use the preambles different from one another. The wireless terminals each use the preamble specified to itself. The preamble patterns in the BA frames that the access point 11 receives from the wireless terminals are thereby orthogonal to one another. This allows the access point 11 to correctly estimate the channel response matrix of the uplinks by making use of these preambles. The access point 11 can spatially separate the data sections subsequent to the preamble fields in the BA frames properly by making use of the channel response matrix of the uplinks.

Functional Block Diagram

The access point 11 includes a wireless communication device (see FIG. 7 to be described later) installed therein. The wireless communication device includes a wireless communicator 105, a controller 101, and a buffer 104. The controller 101 in the access point 11 controls communication with a plurality of wireless terminals 1 to 4.

In addition, each wireless terminal is similarly provided with a wireless communication device (see FIG. 8 to be described later). The wireless communication device includes a wireless communicator 205, and a controller 201. The controller 201 in each wireless terminal controls communication with the access point 11.

The access point 11 is connected to the wireless network (referred to as first network) that is formed with the wireless terminals, and may be connected to another wired or wireless network (referred to as second network) in addition to the first network. The access point 11 relays communication between the first network and the second network, or among the wireless terminals. The access point 11 receives frames addressed to the wireless terminals 1 to 4 from the second network or a wireless terminal in the first network, and holds the frames in an internal buffer thereof.

Figure 7:
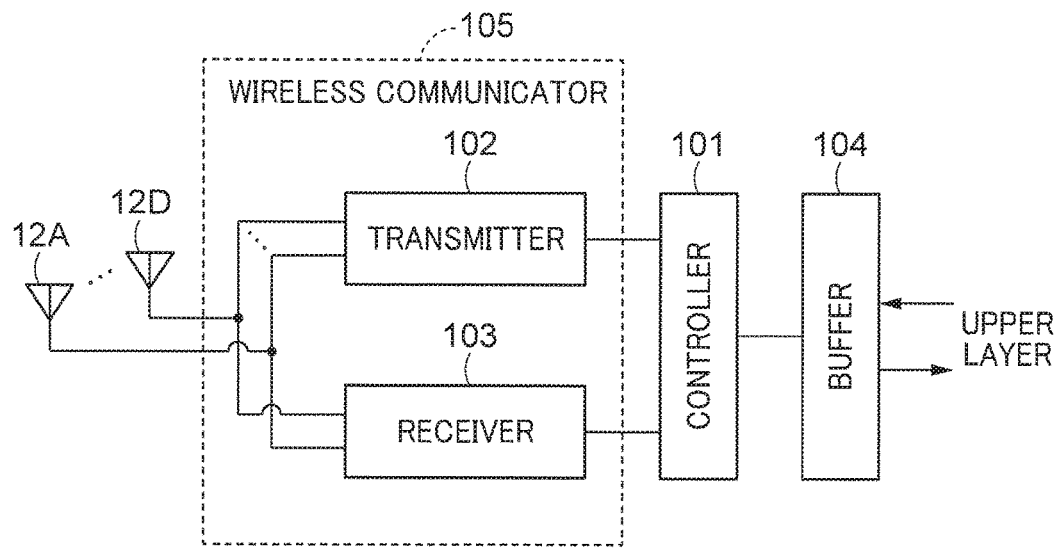
FIG. 7 is a functional block diagram of a wireless communication device built in an access point.

FIG. 7 is a functional block diagram of a wireless communication device of the access point 11. As described above, FIG. 7 shows a configuration of the wireless communication device on the first network side.

The wireless communication device includes a controller 101, a transmitter 102, a receiver 103, antennas 12A, 12B, 12C, and 12D, and a buffer 104. The controller 101 corresponds to controlling circuitry or a baseband integrated circuit that controls communication with the wireless terminals, and the transmitter 102 and the receiver 103 form, as one example, a wireless communicator or an RF (Radio Frequency) integrated circuit. The processing of the controller 101 may be executed by software (a program) that runs on a processor such as a CPU, may be executed by hardware, or may be executed by both the software and the hardware. The controller may include the buffer 104 or may not include the buffer 104 (in the example of FIG. 7, the buffer 104 is included). The wireless communication device may provide an internal memory storing space separation information etc. (which is not shown in the drawing). The wireless communication device may connect to an external memory storing the space separation information etc.

The buffer 104 is a storage used for exchanging data frames between an upper layer and the controller 101. The upper layer stores in the buffer 104 frames received through the second network to relay them to the first network, or receives frames that are received through the first network, from the controller 101. The upper layer may perform a communication process in layers higher than the MAC layer such as TCP/IP and UDP/IP. In addition, the upper layer may perform a process in the application layer for processing data. The processing of the upper layer may be performed by software (program) processing that a processor such as a CPU executes, may be performed by hardware, or may be performed by both the software and the hardware.

The controller 101 mainly performs processing in the MAC layer and part of processing in the physical layer (e.g., a process relating to MIMO). The controller 101 transmits and receives frames via the transmitter 102 and the receiver 103 to perform a communication control over the wireless terminals in the first network. In addition, the controller 101 may perform a control so as to periodically transmit a beacon frame. The controller 101 may include a clock generator. In addition, the controller 101 may be configured so as a clock is input from the outside. The controller 101 may manage the internal time thereof by the clock. The controller 101 may output the clock generated by the clock generator to the outside.

The controller 101 establishes a wireless link with the wireless terminal, through a process such as authentication as necessary, upon receiving an association request from the wireless terminal. The controller 101 periodically checks the buffer 104. Alternatively, the controller 101 checks the buffer 104 in response to a trigger from the outside such as the buffer 104. Upon confirming that the buffer 104 has frames to be transmitted to the plurality of wireless terminal, the controller 101 generates data frames 601 to 604 addressed to the wireless terminal containing spatial separation information set to one or both of a common information field and a terminal information field.

The controller 101 reads out the frames addressed to the wireless terminals from the buffer 104, subjects them to a process in the MAC layer, and transmits them to the transmitter 102. In addition, the controller 101 calculates transmission weights of transmission systems based on propagation channel information of downlinks obtained from the wireless terminals in advance, and transmits them to the respective transmission systems of the transmitter 102. The transmitter 102 obtains information on the transmission weights of the respective transmission systems. The transmitter 102 modulates the frame for each transmission system and multiplies the transmission weights corresponding to the transmission systems to the modulated signals. Each transmission system performs a process in the physical layer such as the addition of a PHY header to the multiplied signal, and performs DA conversion, a filtering process to extract a signal component in a desired band, and frequency conversion (upconversion) on the frame that has been subjected to the process in the physical layer. Each transmission system further amplitudes the frequency-converted signal, and radiates the signals into space through the corresponding antennas, in the form of radio waves. In such a manner, the downlink multiuser MIMO transmission to the wireless terminals is performed.

The signals received at the antennas are processed by the receiver 103 for each of reception systems corresponding to the antennas. For example, the signals of the BA frames 611 to 614 returned from the plurality of wireless terminals are received at the antennas (uplink multiuser MIMO reception) at the same time. The received signals of the antennas are input into the reception systems in the receiver 103. The received signals are amplified by the respective reception systems, frequency-converted (downconverted), and the desired band components thereof are extracted through the filtering process. The extracted signals are further converted into digital signals through an AD conversion, subjected to processing in the physical layer such as demodulating, and thereafter input into the controller 101.

The controller 101 performs channel estimation on the basis of the preamble patterns of the signals input from the reception systems to obtain the channel response matrix of the uplinks. The controller 101 separates the data sections subsequent to the preamble fields for each wireless terminal (for each BA frame) on the basis of the channel response matrix of the uplinks obtained through estimation, and reads out the CRC information from the data sections.

The above-described manner of dividing processes into those performed by the controller 101 and the transmitter 102 is one example, and another manner of dividing also being possible. For example, the controller 101 may perform processes within a digital domain, and the transmitter 102 may perform processes subsequent to the DA conversion. With respect to the manner of dividing processes into those performed by the controller 101 and the receiver 103, likewise, the receiver 103 may perform processes up to the A/D conversion, and the controller 101 may perform processes within the digital domain subsequent thereto, including processes in the physical layer. A manner of dividing other than those described here may be employed.

Figure 8:
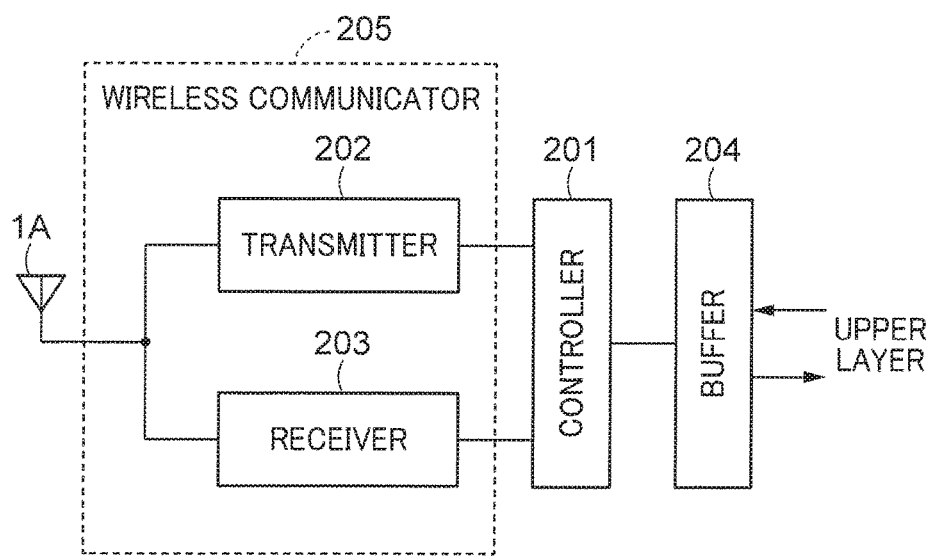
FIG. 8 is a functional block diagram of a wireless communication device built in a wireless terminal.

FIG. 8 is a functional block diagram of the wireless communication device installed in the wireless terminal 1. The wireless communication devices installed in the wireless terminals 2 to 4 each also have the configuration of the wireless terminal 1, thus the description for the wireless terminal 1 below will be therefore used instead of those for the wireless terminals 2 to 4. The wireless communication device includes a controller 201, a transmitter 202, a receiver 203, an antenna 1A, and a buffer 204. The controller 201 corresponds to controlling circuitry or a baseband integrated circuit that controls communication with the access point 11, and the transmitter 202 and the receiver 203 form, as one example, a wireless communicator or an RF integrated circuit. The processing of the controller 201 may be executed by software (a program) that runs on a processor such as a CPU, may be executed by hardware, or may be executed by both software and hardware. The controller 201 may include the buffer 204 or may not include the buffer 204 (in the example of FIG. 7, the buffer 204 is included). The wireless communication device may provide an internal memory storing space separation information etc. (which is not shown in the drawing). The wireless communication device may connect to an external memory storing the space separation information etc.

The buffer 204 is a storage for exchanging data frames between an upper layer and the controller 201. The upper layer generates frames to be transmitted to the other wireless terminals, the access point 11, or a device such as a server in the other network, and stores the frames in the buffer 204, or receives frames that are received on the first network, via the buffer 204. The upper layer may perform a communication process in layers higher than the MAC layer such as TCP/IP and UDP/IP. In addition, the upper layer may perform a process in the application layer for processing data. The processing of the upper layer may be performed by software (program) processing that a processor such as a CPU executes, may be performed by hardware, or may be performed by both software and hardware.

The controller 201 mainly performs MAC layer processing. The controller 201 transmits/receives frames to/from the access point 11 via the transmitter 202 and the receiver 203 to perform a communication control with the access point 11. The controller 201 receives, for example, the beacon frame periodically transmitted from the access point 11 via the antenna 1A and the receiver 203. The controller 201 may include a clock generation unit. In addition, the controller 201 may be configured to receive a clock from the outside. The controller 201 may manage the internal time thereof by the clock. The clock generated by the clock generation unit may be output to the outside.

The controller 201 makes an association request to the access point 11, as one example, upon receiving a beacon frame, and establishes a wireless link with the access point 11 through a process such as authentication as necessary.

The controller 201 periodically checks the buffer 204. Alternatively, the controller 201 checks the buffer 204 in response to a trigger from the outside such as the buffer 204. Upon confirming that there is a frame to be transmitted to the access point 11, the controller 201 reads out the frame, transmitting it to the transmitter 202 via the antenna 1A in accordance with a transmission scheme to use. The transmitter 202 performs a process in the desired physical layer such as a modulating process or an addition of a physical header with respect to the frame received from the controller 201. In addition, the transmitter 202 performs a DA conversion, a filtering process to extract a signal component in a desired band, and a frequency conversion (upconversion), to the frame that has been subjected to the process in the physical layer. The transmitter 202 amplifies the frequency-converted signal and radiates the signal as radio waves into space through the antenna.

The signal received at the antenna 1A is processed by the receiver 203. For example, the signal of the data frame 601 addressed to the wireless terminal 1 from the access point 11 is received, and processed by the receiver 203. The received signal is amplified by the receiver 203, frequency-converted (downconverted), and the components thereof in a desired band are extracted through the filtering process. The extracted signals are further converted into digital signals through an AD conversion, subjected to a process in physical layer such as demodulating, and thereafter input into the controller 201.

The controller 201 reads the spatial separation information stored in the common information field and the terminal information field of the data frame 601. In the case where the read information contains information specifying a preamble pattern used in transmitting a BA frame, the preamble pattern to be used is specified based on the information. In the case where a preamble pattern to be used is given in advance, the preamble pattern may be used.

In addition, the controller 101 performs control such that a BA frame is transmitted after a lapse of a given amount of time from the reception of the data frame 601. The controller 101 performs CRC check on the received data frame, and generates a BA frame in which information representing a CRC result is stored. Here, in the preamble field of the BA frame, the specified preamble pattern describe above is stored.

The transmitter 102 modulates the generated BA frame and performs a process in the physical layer, such as adding a PHY header, on the modulated signal. Furthermore, the transmitter 102 performs a DA conversion, a filtering process to extract a signal component in a desired band, and a frequency conversion (upconversion), on the frame having been subjected to the process in the physical layer. The transmitter 102 amplifies the frequency-converted signal and radiates the signal into space through any one of the antennas, in the form of radio waves.

The above-described manner of dividing processes into those performed by the controller 201 and those performed by the transmitter 202 is one example, and another manner of dividing can be employed. For example, the controller 201 may perform processes within a digital domain, and the transmitter 202 may perform processes subsequent to the DA conversion. With respect to the manner of dividing the processes into those performed by the controller 201 and those performed by the receiver 203, likewise, the receiver 203 may perform processes up to the AD conversion, and the controller 201 may perform processes within the digital domain subsequent thereto, including the process in the physical layer. A manner of dividing other than that described here may be employed.

The buffers 104 and 204 may be a volatile memory such as a DRAM, or a non-volatile memory such as a NAND or an MRAM. In addition, the internal memory and the external memory may be the above-described volatile memory and non-volatile memory, as well as an SSD, a hard disk, or the like.

Flowchart

Figure 9:
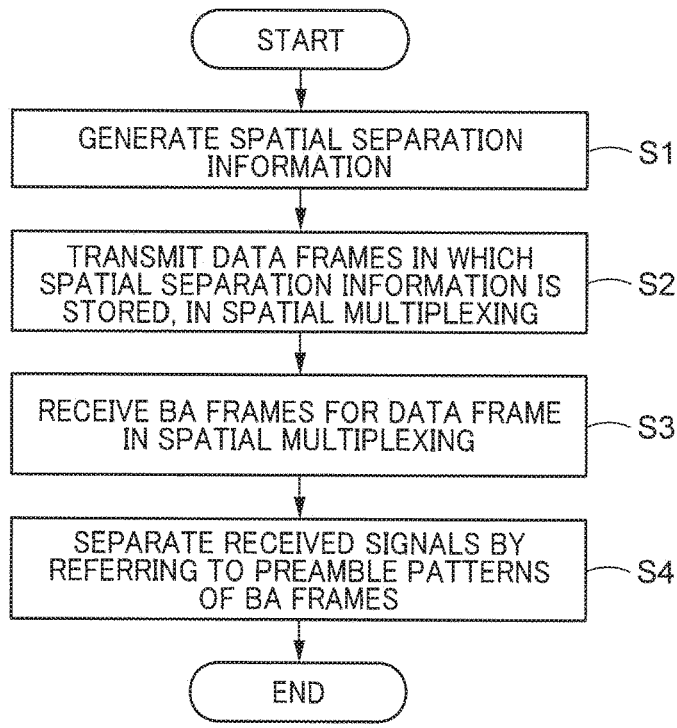
FIG. 9 is a flowchart of a controller built in the access point.

FIG. 9 is a flowchart of a basic operation example of the controller 101 built in the access point 11 according to the present embodiment.

In step S1, the controller 101 generates the spatial separation information to be stored in the common information fields and the terminal information fields of the data frames 601 to 604. If regulations and the like about the specification of an orthogonal matrix or preamble patterns are stored in the internal memory, they are read from the internal memory.

In step S2, the controller 101 stores the spatial separation information generated in step S1 in the common information fields and the terminal information field of the data frames 601 to 604 and transmits the data frames 601 to 604 in the spatial multiplexing (downlink multiuser MIMO transmission) via the wireless communicator 105.

In step S3, the controller 101 receives the BA frames 611 to 614 for the data frames 601 to 604 via the wireless communicator 105. The BA frames 611 to 614 are transmitted from the wireless terminals 1 to 4 in the spatial multiplexing (uplink multiuser MIMO transmission).

In step S4, the controller 101 refers to the preamble fields 501 of the received BA frames 611 to 614 and spatially separates the individual BA frame.

Figure 10:
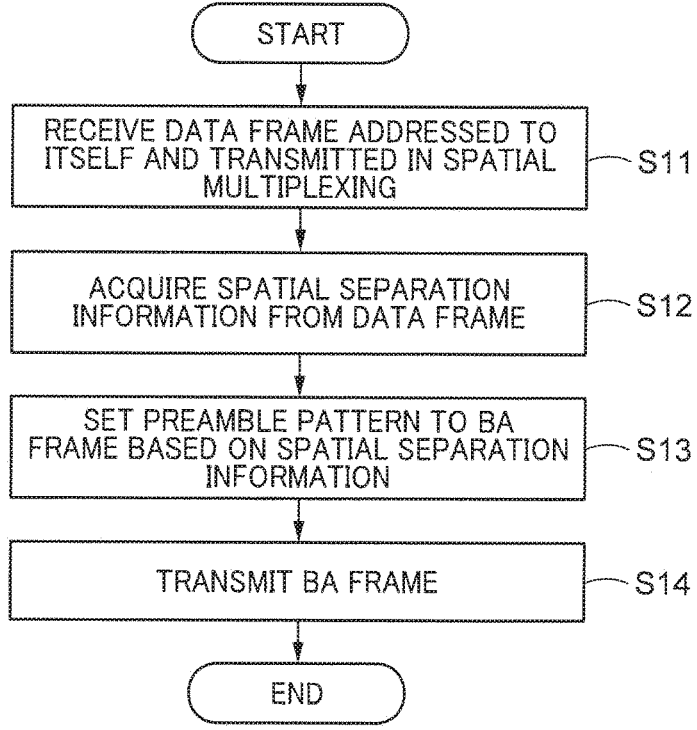
FIG. 10 is a flowchart of a controller built in the wireless terminal.

FIG. 10 is a flowchart of a basic operation example of the controller 201 built in the wireless terminal according to the present embodiment.

In step S11, the controller 201 receives a data frame addressed to it via the wireless communicator 205. The data frame is transmitted from the access point 11 in the spatial multiplexing.

In step S12, the controller 201 acquires the spatial separation information from the received data frame. The acquired spatial separation information can be stored in the internal memory.

In step S13, the controller 201 generates a BA frame based on the spatial separation information acquired in step S12. To the preamble field of the BA frame, a preamble pattern specified in the spatial separation information is set.

In step S14, the controller 201 transmits the BA frame via the wireless communicator 205. Here, the wireless terminals 1 to 4 simultaneously transmit BA frames using the same frequency band (uplink multiuser MIMO transmission).

As seen from the above, according to the first embodiment, the wireless terminals transmit acknowledgement response frames in the uplink multiuser MIMO. This shortens a time taken for the acknowledgement of data frames transmitted in the downlink multiuser MIMO, enabling an improved throughput.

In addition, the access point notifies, to the wireless terminals in advance, information necessary to transmit acknowledgement response frames in the uplink multiuser MIMO. This allows the access point to separate acknowledgement response frames transmitted from a plurality of wireless terminals in the uplink multiuser MIMO.

Second Embodiment

In the first embodiment, the access point 11 transmits the spatial separation information to the wireless terminals 1 to 4 using the MAC headers or PHY headers of the data frames 601 to 604. In the present embodiment, description will be made about how to transmit the spatial separation information using notification frames different from data frames to be transmitted in the downlink multiuser MIMO transmission.

Transmission of Spatial Separation Information with Notification Frame

In the present embodiment, description will be made about how the access point 11 transmits the spatial separation information by adding the spatial separation information to a Group ID Management frame, which is defined in the IEEE 802.11ac standard. In the present specification, such a Group ID Management frame will be referred to as a "Group ID Management frame with spatial separation information".

Figure 11:
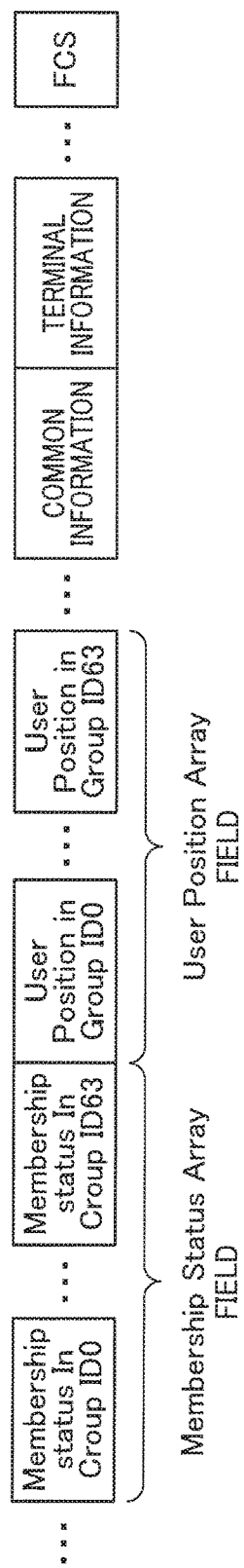
FIG. 11 illustrates an example of the format of a Group ID Management frame with spatial separation information according to a second embodiment.

FIG. 11 illustrates an example of a Group ID Management frame with spatial separation information.

This frame contains a Membership Status Array field, a User Position Array field, a common information field, and a terminal information field.

According to the IEEE 802.11ac standard, each of a plurality of wireless terminals to be objects in the same multiuser transmission is assigned with a Group ID, as a method to implement the downlink multiuser MIMO transmission. The Membership Status Array field is a field for the notification of a group to which a wireless terminal being a transmission destination of the Group ID Management frame with spatial separation information belongs. In FIG. 11, this field notifies belonging information on groups having Group IDs 0 to 63. For example, a Membership Status In Group ID 1 in the Membership Status Array field being "0" indicates that this wireless terminal does not belong to the Group ID 1, and a Membership Status In Group ID 1 being "1" indicates that this wireless terminal belongs to the Group ID 1.

The User Position Array field is a field for the notification of a user's position of a wireless terminal in each group. In FIG. 11, this field notifies user's positions groups having Group IDs 0 to 63. For example, a User Position In Group ID 1 in the User Position Array field being "1" indicates that the user's position of the wireless terminal in the Group ID 1 is "1". A wireless terminal can belong to a plurality of groups and, in this case, can have a different user's position for each group.

In the common information field and the terminal information field, information to be notified to the wireless terminals 1 to 4 in common and information to be notified to each wireless terminal are stored, respectively, as the spatial separation information, as in the first embodiment.

In the common information field, an orthogonal matrix such as the matrices (1) and (2) can be stored. Here, the access point 11 may be configured to allow a different orthogonal matrix to be stored for each Group ID. For example, it is possible to notify the matrix (1) to the Group ID 1 of a group to which two wireless terminals belong, and to notify a two-by-two matrix different from the matrix (1) to the Group ID 3 of a group to which two wireless terminals belong. Alternatively, the matrix (2) is notified to the Group ID 3 of a group to which four wireless terminals belong.

In the terminal information field, row numbers (or column numbers) of the orthogonal matrix are stored, as an example of specifying the preamble patterns for wireless terminals. Here, the access point 11 may change a preamble pattern to be specified according to the user's position of a wireless terminal. For example, a preamble pattern may be specified such as the first row of the matrix (1) for a user's position "0" and the second row of the matrix (1) for a user's position "1". Alternatively, the preamble pattern may be specified using a Group ID and a user's position in combination, such as the first row of the matrix (1) for a Group ID 1 and a user's position "1", and the second row of the matrix (1) for a Group ID 2 and a user's position "1".

The access point 11 transmits the Group ID Management frame with spatial separation information to the wireless terminals 1 to 4 before transmitting the data frames 601 to 604 in the downlink multiuser MIMO. The transmission of the Group ID Management frame with spatial separation information is performed, for example, in unicast. The access point 11 can transmit the Group ID Management frame with spatial separation information in association. In addition, when wireless terminals in each group are reorganised, a Group ID Management frame with spatial separation information containing updated spatial separation information may be transmitted again.

The access point 11 may store a Group ID, a user's position and spatial separation information for a plurality of wireless terminals in the Group ID Management frame with spatial separation information. In this case, the access point 11 can transmit the Group ID Management frame with spatial separation information in broadcast or multicast.

Note that the frame format illustrated in FIG. 11 is merely an example, and other formats may be used. For example, the common information field and the terminal information field may be interchanged, or positions into which these fields are inserted may be interchanged. A different field into which the common information field and the terminal information field are integrated may be provided. In addition, the spatial separation information may be stored in a reserved area of another field.

Although the spatial separation information is added to the Group ID Management frame defined in the IEEE 802.11ac standard in the present embodiment, a frame to notify the spatial separation information (notification frame) may be newly defined. Note that addresses according to a transmission source and a transmission destination can be stored also in the Group ID Management frame with spatial separation information and the newly defined notification frame, which is however not illustrated in FIG. 11. In addition, the Group ID Management frame with spatial separation information may be transmitted to the wireless terminals 1 to 4 after the data frames 601 to 604 are transmitted to the wireless terminals 1 to 4 in the downlink multiuser MIMO. At this point, it is allows to perform any one of a method in which the Group ID Management frame with spatial separation information is transmitted in unicast for each terminal as previously described, and a method in which the Group ID Management frame with spatial separation information is transmitted in broadcast or multicast transmission. In this case, a timing at which the wireless terminals 1 to 4 perform the uplink multiuser MIMO transmission may be determined by any method. For example, when the Group ID Management frame with spatial separation information is subjected to broadcast or multicast transmission, the timing of the transmission may be after a predetermined time from the completion of receiving the Group ID Management frame with spatial separation information. Alternatively, taking into consideration a time taken for the transmission of the Group ID Management frame with spatial separation information, the timing may be determined in the form of an elapsed time from the completion of receiving the data frames 601 to 604. Alternatively, information on the timing to perform the uplink multiuser MIMO transmission may be set to the common information field. As a modification, for example, in the case where the information is set to the common information field, a terminal can determine the timing of the uplink multiuser MIMO transmission following the information, or in the case where the information is not set to the common information field, the terminal can determine the timing of the uplink multiuser MIMO transmission by a predetermined method (e.g., determining a transmission timing as a timing after a predetermined time from the completion of receiving a data frame transmitted in the downlink multiuser MIMO), for example. The timing may be determined by a method other than the methods described here.

Transmission of BA Frames in Uplink Multiuser MIMO

After transmitting the Group ID Management frame with spatial separation information, the access point 11 transmits the data frames 601 to 604 in the downlink multiuser MIMO. Here, the access point 11 can store the number of streams for each of Group IDs and user's positions to which the wireless terminals 1 to 4 belong, in the PHY headers or the MAC headers of the data frames 601 to 604.

The wireless terminals 1 to 4 having receiving the data frames each check the CRC of the data frame received from the access point 11 to examine whether the data frame has been received without error, as in the first embodiment. Then, after a lapse of the given amount of time T1, the wireless terminals 1 to 4 each transmit a BA frame to the access point 11 in the uplink multiuser MIMO.

At this point, the wireless terminals each refer to a Group ID stored in the PHY header or MAC header of the data frame and the spatial separation information notified in advance with the Group ID Management frame with spatial separation information to select a preamble pattern (bit string) to be set to the preamble field of the BA frame. When information on a user's position is necessary for the selection of the preamble pattern, each wireless terminal can specify a preamble pattern by referring to information on a user's position for each Group ID notified with the Group ID Management frame with spatial separation information.

Flowchart

Figure 12:
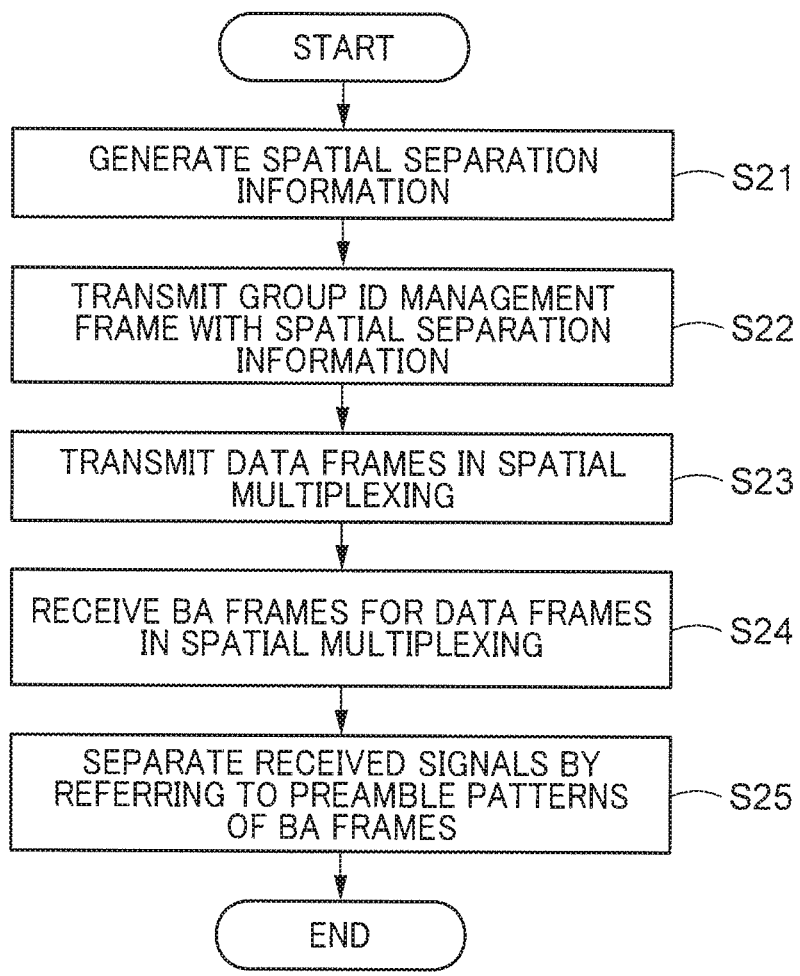
FIG. 12 is a flowchart of a controller built in the access point.

FIG. 12 is a flowchart of a basic operation example of the controller 101 built in the access point 11 according to the present embodiment.

In step S21, the controller 101 generates the spatial separation information to be stored in the common information fields and the terminal information fields of the data frames 601 to 604. If regulations and the like about the specification of an orthogonal matrix or preamble patterns are stored in the internal memory, they are read from the internal memory.

In step S22, the controller 101 generates a Group ID Management frame with spatial separation information that contains the spatial separation information generated in step S21 stored in the common information field and the terminal information field thereof (a notification frame) and transmits the Group ID Management frame with spatial separation information via the wireless communicator 105.

In step S23, the controller 101 transmits the data frames 601 to 604 in the spatial multiplexing (downlink multiuser MIMO transmission) via the wireless communicator 105.

In step S24, the controller 101 receives the BA frames 611 to 614 for the data frames 601 to 604 via the wireless communicator 105. The BA frames 611 to 614 are transmitted from the wireless terminals 1 to 4 in the spatial multiplexing (uplink multiuser MIMO transmission).

In step S25, the controller 101 refers to the preamble fields 501 of the received BA frames 611 to 614 and spatially separates the individual BA frame.

Figure 13:
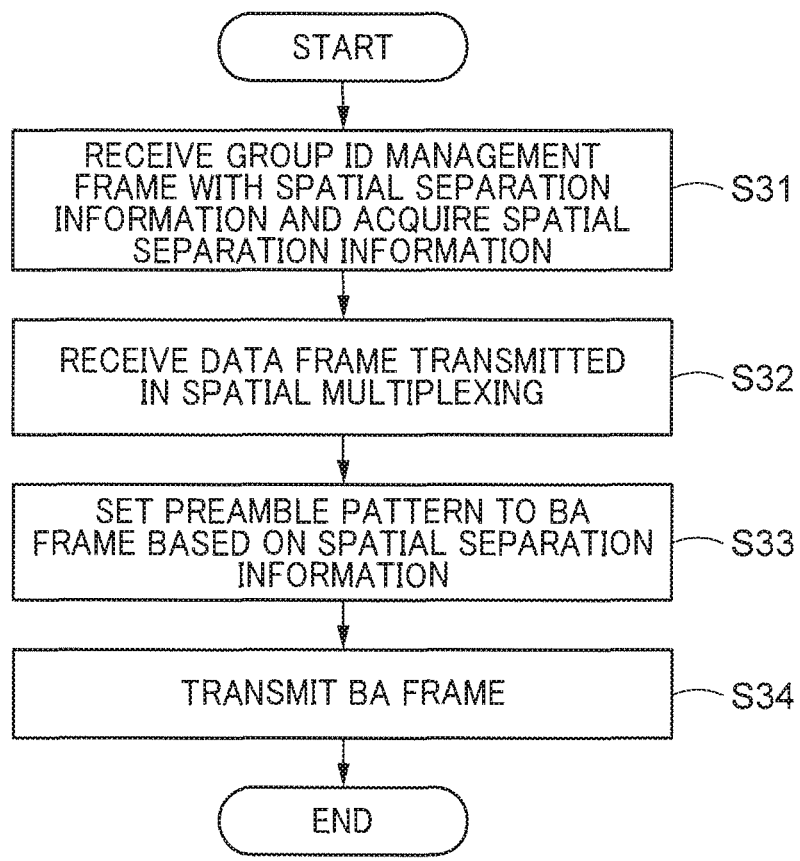
FIG. 13 is a flowchart of a controller built in the wireless terminal.

FIG. 13 is a flowchart of a basic operation example of the controller 201 built in the wireless terminal according to the present embodiment.

In step S31, the controller 201 receives the Group ID Management frame with spatial separation information transmitted from the access point 11 (the notification frame) via the wireless communicator 205. The controller 201 acquires the spatial separation information from the received Group ID Management frame with spatial separation information.

In step S32, the controller 201 receives a data frame addressed to it via the wireless communicator 205. The data frame is transmitted from the access point 11 in the spatial multiplexing.

In step S33, the controller 201 generates a BA frame based on the spatial separation information acquired in step S31. To the preamble field of the BA frame, a preamble pattern specified in the spatial separation information is set.

In step S34, the controller 201 transmits an acknowledgement response frame via the wireless communicator 205. Here, the wireless terminals 1 to 4 simultaneously transmit acknowledgement response frames using the same frequency band (uplink multiuser MIMO transmission).

As seen from the above, according to the second embodiment, the access point notifies, to the wireless terminals in advance, information necessary to transmit acknowledgement response frames in the uplink multiuser MIMO, before transmitting data frames. This allows the access point to separate acknowledgement response frames transmitted from a plurality of wireless terminals in the uplink multiuser MIMO.

Third Embodiment

In the first embodiment, the wireless terminals that perform the uplink multiuser MIMO transmission each use one stream for the transmission. Likewise, the number of streams used for the downlink multiuser MIMO transmission from the access point to each wireless terminal is one. The present embodiment will describe an embodiment of the case where a wireless terminal can perform transmission or reception using two or more streams, that is, a wireless terminal that can perform transmission or reception in MIMO. The present embodiment will be described below in detail.

Figure 14:
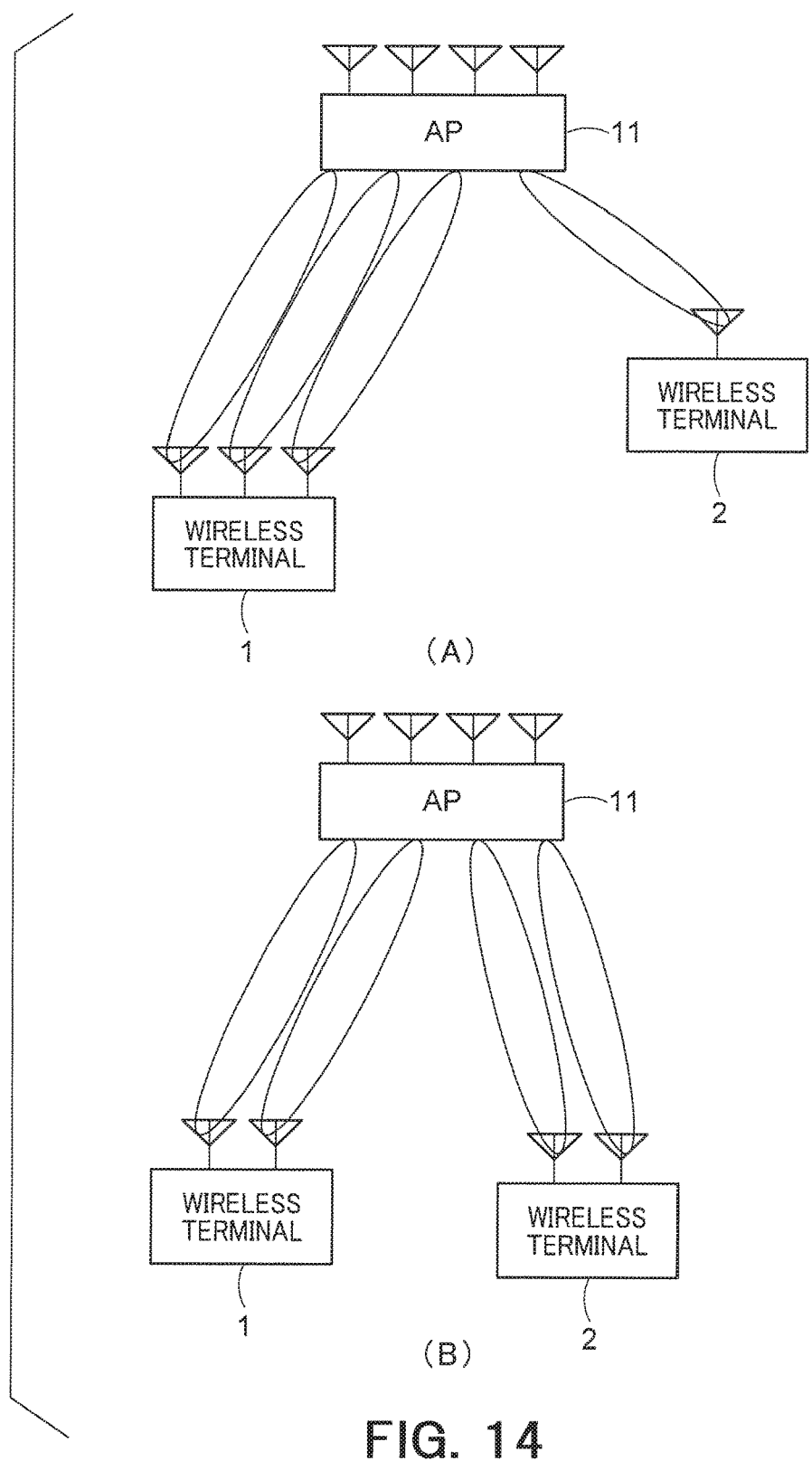
FIG. 14 shows diagrams illustrating a wireless communication system according to a third embodiment.

FIG. 14(A) and FIG. 14(B) show examples of the wireless communication system in which a wireless terminal can perform transmission and reception using two or more streams, that is, a wireless terminal that can perform transmission and reception in MIMO.

In the example of FIG. 14(A), a wireless terminal 1 includes three antennas, and a wireless terminal 2 includes one antenna. The wireless terminal 1 receives three data streams in MIMO, and the wireless terminal 2 receives one data stream. In FIG. 14(B), the wireless terminal 1 and the wireless terminal 2 each include two antennas, and each transmit two data streams in MIMO.

In either case of FIG. 14(A) or FIG. 14(B), the total number of streams in the downlink multiuser MIMO from the access point 11 is four. Note that the downlink user multiplexing number is four in the example of FIG. 1, whereas the downlink user multiplexing number is two in the examples of FIG. 14(A) and FIG. 14(B).

Note that a block configuration of the wireless communication device installed in the MIMO-supported wireless terminal is similar to that shown in FIG. 7. The configuration and operation thereof will be omitted because they are obvious from the MIMO operation of the access point described thus far.

Transmission of BA Frame in One Stream

The wireless terminal 1 illustrated in FIG. 14(A) and the wireless terminals 1 and 2 illustrated in FIG. 14(B) can each receive a data frame from the access point 11 in a plurality of streams and can each transmit a BA frame in one stream in the multiuser MIMO. In this case, while the number of streams in the downlink multiuser MIMO is four, the number of streams in the uplink multiuser MIMO is two. In other words, the number of streams in uplink is equal to a user number of multiplexing in downlink. The transmission of a BA frame by each wireless terminal in the uplink multiuser MIMO in one stream can be regulated, for example, in the IEEE 802.11 standard.

To notify the spatial separation information to the wireless terminals 1 and 2, the access point 11 can store, in the common information field, the user number of multiplexing and an orthogonal matrix in proportion to the user number of multiplexing, and can store, in the terminal information field, a row number (or a column number) of the orthogonal matrix to be used by each wireless terminal. For example, since the user number of multiplexing is two in FIG. 14(A), the matrix (1) can be stored in the common information field, and information indicating that, for example, the first row is specified for the wireless terminal 1, and the second row is specified for the wireless terminal 2, can be stored in the terminal information field. For the notification of the spatial separation information, the method described in the first and second embodiments (using the MAC header, the PHY header, and the Group ID Management frame with spatial separation information) can be used.

The wireless terminals 1 and 2 each specify a preamble pattern to be used by itself based on the spatial separation information notified from the access point 11 and each transmit a BA frame for the data frame received in the plurality of streams in the uplink multiuser MIMO in one stream. The method of specifying and using the preamble pattern is the same as that in the first and second embodiments and will not be notified.

In addition, the access point 11 can also notify preamble pattern information for each user's position, as the spatial separation information. For example, in the case where the number of wireless terminals belonging to a Group ID 1 is four, the total number of streams in the downlink multiuser MIMO transmission is five, and the numbers of streams in downlink for wireless terminals belonging to user's positions 0 to 3 are 2, 0, 2, and 1, respectively (the wireless terminal belonging to the user's position 1 has no transmission of a data frame), wireless terminals belonging to user's positions 0, 2, and 3 and having received data frames each transmit a BA frame in the uplink multiuser MIMO in one stream.

In this case, the access point 11 may notify, as the spatial separation information, a user number of multiplexing of three and a three-by-three orthogonal matrix in proportion to the user number of multiplexing, using the common information field, and may notify a row number (or a column number) to be used by each wireless terminal, using the terminal information field. Each wireless terminal uses the spatial separation information specified from the access point 11 to specify a preamble pattern to be used by it.

Alternatively, it is allowed to define such a rule that the row numbers of an orthogonal matrix is assigned to wireless terminals in an ascending order of user's position starting with the smallest user's position. In this case, the access point 11 may notify, as the spatial separation information, a three-by-three orthogonal matrix and the number of streams in downlink for each user's position. Each wireless terminal grasps the number of streams for each user's position, which allows the wireless terminal to grasp a user number of multiplexing and specify a preamble pattern to be used by it. For example, in the case where the number of wireless terminals belonging to the Group ID 1 is four, the total number of streams in the downlink multiuser MIMO transmission is five, and the numbers of streams in downlink for wireless terminals belonging to user's positions 0 to 3 are 2, 0, 2, and 1, respectively, preamble patterns can be specified in such a manner that the first row of the three-by-three orthogonal matrix is specified for the wireless terminal belonging to the user's position 0, the second row of the three-by-three orthogonal matrix is specified for the wireless terminal belonging to the user's position 2, and the third row of the three-by-three orthogonal matrix is specified for the wireless terminal belonging to the user's position 3. In the case where the value of the matrix is defined in the IEEE 802.11 standard, and the wireless terminals 1 to 4 stores the value in their internal memories, the access point 11 need not transmit the value of the matrix to the wireless terminals 1 to 4.

The wireless terminals 1 to 4 can refer to a user number of multiplexing (the total number of streams) in uplink that is explicitly or implicitly notified from the access point 11 and read corresponding matrices from their internal memories. An example of the implicit notification is that the access point 11 notifies the number of streams in downlink for each user's position. Each wireless terminal can acquire the user number of multiplexing (the total number of streams) in uplink by counting up the number of wireless terminals other than a number of streams of zero.

Transmission of BA Frame in Plurality of Streams

The wireless terminals 1 and 2 illustrated in FIG. 14(A) and FIG. 14(B) can transmit a BA frame using streams having the same number as that of streams received from the access point 11. For example, in the case illustrated in FIG. 14(A), the wireless terminal 1 transmits a BA frame in three streams, and the wireless terminal 2 transmits a BA frame in one stream.

The access point 11 can notify, to the wireless terminals 1 and 2, the total number of streams in uplink and an orthogonal matrix in proportion to the total number of streams using the common information field, and a row number (or a column number) of the orthogonal matrix to be used by each wireless terminal using the terminal information field. In FIG. 14(B), since the total number of streams in the uplink multiuser MIMO is four, the matrix (2) can be stored in the common information field, and information indicating that, for example, the first and second rows are specified for the wireless terminal 1, and the third and fourth rows are specified for the wireless terminal 2, can be stored in the terminal information field. For the notification of the spatial separation information, the method described in the first and second embodiments (using the MAC header, the PHY header, and the Group ID Management frame with spatial separation information) can be used.

The wireless terminals 1 and 2 can specify preamble patterns to be used by them based on the spatial separation information notified from the access point 11 and can transmit BA frames in the uplink multiuser MIMO using streams having the same number of that used for the respective received data frames.

Alternatively, the access point 11 may be configured to notify, as the spatial separation information, the number of streams to be used in the uplink multiuser MIMO transmission by each wireless terminal. For example, in FIG. 14(B), information indicating that, for example, the wireless terminal 1 uses one stream, and the wireless terminal 2 uses two streams. For the notification of the numbers of streams, the common information field, the terminal information field, or the other fields can be used. The wireless terminals 1 and 2 determine the numbers of streams to be used to transmit BA frames in accordance with the notified numbers of streams. At this point, transmission using one stream can be notified in such a manner that the wireless terminal 1 uses one stream, and the wireless terminal 2 uses one stream.

The total number of streams specified by the access point 11 is adjustable within a range not exceeding the reception capability (the number of antennas) of the access point 11. In addition, the number of streams specified to each wireless terminal is also adjustable within a range not exceeding the reception capability of each wireless terminal (the number of antennas).

Besides the above, it is allowed to define such a rule that a BA frame is transmitted using streams having the same number as the number of streams received from the access point 11. For example, in the case where the number of wireless terminals belonging to a Group ID 1 is four, the total number of streams in the downlink multiuser MIMO transmission is five, and the numbers of streams in downlink for wireless terminals belonging to user's positions 0 to 3 are 2, 0, 2, and 1, respectively (the wireless terminal belonging to the user's position 1 has no transmission of a data frame), wireless terminals belonging to user's positions 0, 2, and 3 each transmit a BA frame in the uplink multiuser MIMO using two streams, two streams, and one stream, respectively. Also in this case, it is allowed to define such a rule that the row numbers of an orthogonal matrix is assigned to wireless terminals in an ascending order of user's position starting with the smallest user's position, so that each wireless terminal specifies a preamble pattern based on this rule.

In the case where the value of the matrix is defined in the IEEE 802.11 standard, and the wireless terminals 1 to 4 stores the value in their internal memories, the access point 11 need not transmit the value of the matrix to the wireless terminals 1 to 4. The wireless terminals 1 to 4 can refer to the total number of streams in uplink that is directly or indirectly notified from the access point 11 and read corresponding matrices from their internal memories.

How to Notify Number of Streams

In the case where there is a wireless terminal that can perform transmission in MIMO, the control unit 101 of the access point 11 (explicitly or implicitly) uses the common information field to specify the total number of streams in transmitting BA frames, and to specify the number of streams transmission-allowed to the wireless terminals. Furthermore, row numbers (or column numbers) of the orthogonal matrix can be specified to wireless terminals by the number of streams allowed to be transmitted with the terminal information field. Note that the control unit 101 of the access point 11 may obtain the number of streams that the wireless terminals can handle from the wireless terminals, for example, at the time of associating.

The control unit 101 of the access point 11 may specify a total number of streams in the common information field. Alternatively, in the case where information on the other wireless terminals is contained in the terminal information field, explicit notification of the total number of streams may be omitted because the total number of streams can be detected by calculating the total number of row numbers (or column numbers) for the wireless terminals.

An example of implicitly notifying the number of streams will be described below. For example, let us consider the case where, as shown in FIG. 14(A), the total number of streams used for the uplink multiuser MIMO transmission is four, the wireless terminal 1 uses three streams, and the wireless terminal 2 uses one stream.

The control unit 101 of the access point 11 sets the row numbers 1, 2, and 3 of the orthogonal matrix to the terminal information field corresponding to the wireless terminal 1. The wireless terminal 1 thereby detects that it is allowed the transmission of three streams. In addition, the wireless terminal 1 detects that it uses preamble patterns based on the rows [1, −1, 1, 1], [1, 1, −1, 1], and [1, 1, 1, −1] of row numbers 1, 2, and 3 of the orthogonal matrix corresponding to the total number of transmission streams of four, for respective streams. As described above, the control unit 101 of the access point 11 may notify the total number of streams explicitly in the common information field, or may omit the notification.

Here, in the case of explicitly notifying the number of streams allowed to be transmitted with terminal information fields, a configuration may be employed in which the notification of the row numbers (or column numbers) of the orthogonal matrix is omitted. For example, suppose that the number of streams for the wireless terminal corresponding to the terminal information field 1 is three, and the number of streams for the wireless terminal corresponding to the terminal information field 2 is one. In this case, the wireless terminal corresponding to the terminal information field 1 uses the first to third rows in the orthogonal matrix, and the wireless terminal corresponding to the terminal information field 2 uses the fourth row therein. The wireless terminal sums up the numbers of streams that are stored in the terminal information fields having field numbers smaller than that of the terminal itself, and adds one to the sum to calculate a start value of the row numbers (or column numbers) that the terminal itself uses. That is, by employing a scheme in which the rows or columns in the orthogonal matrix are allocated in an ascending order from the wireless terminals of smaller terminal information fields, it is possible to omit the notification of the row numbers (or column numbers) used by the wireless terminals.

Here, in the case where the number of streams allowed to the wireless terminals is limited to a common value, the common number of streams may be specified with the common information field, and the notification of the number of streams with the terminal information fields may not need to be performed. Also in this case, the total number of streams in the uplink multiuser MIMO may be explicitly notified in the common information field. Alternatively, the wireless terminals may detect the total number of streams on the basis of the common number of streams and the number of terminal information fields, instead of the explicit notification in the common information field.

As described above, according to the present embodiment, by specifying the numbers of streams allowed to the wireless terminals directly or indirectly, the wireless terminals are allowed to additionally use the MIMO transmission. If the numbers of streams to be allowed are not specified to the wireless terminals, the total number of the whole streams transmitted in the uplink multiuser MIMO can outnumber the number of streams that the access point can separate. In addition, it is possible that the wireless terminals cannot select the preamble that does not overlap with those of the other wireless terminals. In the present embodiment, these problems can be solved by specifying the number of streams to be allowed, to the wireless terminals.

Fourth Embodiment

In the first to third embodiments, the access point can estimate the channel response matrix of the uplinks with the preamble patterns orthogonal to one another transmitted from the wireless terminals. In a third embodiment, the wireless terminals transmit the preamble patterns using frequency carriers that are orthogonal to one another, which enables estimating the channel response matrix of the uplinks. The present embodiment works under the assumption of using a multicarrier modulation scheme, in particular, the OFDM (Orthogonal Frequency Division Multiplexing). Note that the above-described first to third embodiments can support both of the multicarrier modulation scheme and a single-carrier modulation scheme. The present embodiment will be described below in detail.

Figure 15:
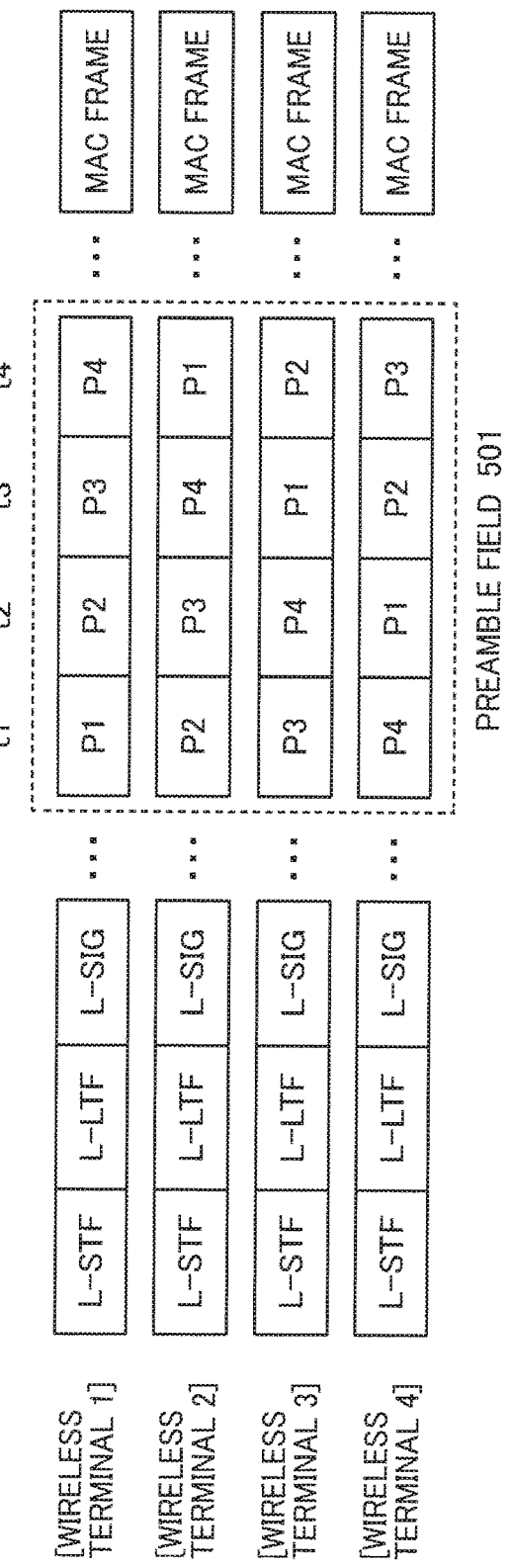
FIG. 15 is a diagram illustrating a schematic configuration example of BA frames transmitted in the uplink multiuser MIMO.

FIG. 15 illustrates a schematic configuration example of BA frames according to the present embodiment. The illustrated schematic configuration example is of BA frames to be transmitted by the wireless terminals 1 to 4. As in the first embodiment, each BA frame contains the preamble field 501, but a value set as a preamble pattern is different from that of the first embodiment.

The preamble field 501 of each BA frame is formed by a plurality of segments, and the individual segments contain carrier patterns P1, P2, P3, and P4 the order of which are different for each segment. One segment corresponds to one OFDM symbol period.

The carrier pattern P1 indicates that the preamble pattern is transmitted with subcarriers f1, f5, and f9 of OFDM modulation. The carrier pattern P2 indicates that the preamble pattern is transmitted with subcarriers f2, f6, and f10 of the OFDM modulation. The carrier pattern P3 indicates that the preamble pattern is transmitted with subcarriers f3, f7, and f11 of the OFDM modulation. The carrier pattern P4 indicates that the preamble data is transmitted with subcarriers f4, f8, and f12 of the OFDM modulation.

The preamble pattern transmitted with the subcarriers may be any as long as it is known to the access point 11. The pattern may be the same for all the subcarriers, or the pattern may be different for each subcarrier.

To the segments, timings t1, t2, t3, and t4 are set in an order from left to right. The timings t1, t2, t3, and t4 represent transmission timings of the respective segments in the preamble field 501. The carrier patterns for the segments at the same timing are different for each wireless terminal. That is, at each of the timings t1, t2, t3, and t4, the subcarriers that the wireless terminals use for transmitting the preamble patterns are orthogonal to one another in terms of frequency. That is, the subcarriers used by the wireless terminals do not interfere with one another. In the case of the OFDM, since the frequencies of the subcarriers are selected such that the subcarriers are orthogonal to one another, the subcarriers used by the wireless terminals do not interfere with one another as long as different subcarriers are used.

For example, at the timing t1, the subcarriers used by the wireless terminal 1 are f1, f5, and f9, the subcarriers used by the wireless terminal 2 are f2, f6, and f10, the subcarriers used by the wireless terminal 3 are f3, f7, and f11, and the subcarriers used by the wireless terminal 4 are f4, f8, and f12. Since the subcarriers do not overlap with subcarriers of the wireless terminals, the subcarriers are orthogonal among the wireless terminals. At the other timings t2 to t4, likewise, the subcarriers are orthogonal among the wireless terminal. Since P1 to P4 are allocated to the wireless terminals 1 to 4 in different orders, none of the subcarriers f1 to f12 interfere with other subcarriers of all the wireless terminals 1 to 4. Such a manner of switching the subcarriers for each segment, while different subcarriers are used among the wireless terminals for the same segment (at the same timing), may be called tone interleaving.

As a specific operation example, at the timing t1, the control unit 201 of the wireless terminal 1 allocates the preamble pattern to the subcarriers f1, f5, and f9, while allocating, for example, null data to the other subcarriers to generate and transmit the OFDM symbols. Likewise, the control unit 201 of the wireless terminal 2 allocates the preamble pattern to the subcarriers f2, f6, and f10, while allocating, for example, null data to the other subcarriers to generate and transmit the OFDM symbols. The control unit 201 of the wireless terminal 3 allocates the preamble pattern to the subcarriers f3, f7, and f11, while allocating, for example, null data to the other subcarriers to generate and transmit the OFDM symbols. The control unit 201 of the wireless terminal 4 allocates the preamble pattern to the subcarriers f4, f8, and f12, while allocating, for example, null data to the other subcarriers to generate and transmit the OFDM symbols.

The access point 11 receives the OFDM symbols at the same time from the wireless terminals 1 to 4 through the antennas. The reception unit 103 or the control unit 101 of the access point 11 can obtain the signal of each subcarrier by demodulating the signal received by each antenna. Specifically, with respect to the timing t1, the signals of the subcarriers f1, f5, and f9 can be obtained for the wireless terminal 1, the signals of the subcarriers f2, f6, and f10 can be obtained for the wireless terminal 2, the signals of the subcarriers f3, f7, and f11 can be obtained for the wireless terminal 3, and the signals of the subcarriers f4, f8, and f12 can be obtained for the wireless terminal 4. With respect to the other timings t2 to t4, likewise, each wireless terminal consecutively generates and transmits the OFDM symbol on the basis of the different carrier patterns. The control unit 101 of the access point 11 can thereby obtain the signals of all the frequency subcarriers f1 to f12 for the wireless terminals 1 to 4, which allows for the estimation of the channel response matrix of the uplinks.

To transmit the preamble pattern with the subcarriers mutually orthogonal to other subcarriers of the wireless terminals, information on the order of the carrier patterns used and the preamble patterns used for the respective carriers needs to be notified to the wireless terminals.

As a method of notification, as with the first to third embodiments, the control unit 101 of the access point 11 can make use of MAC headers of the data frames 601 to 604, PHY headers thereof, or the common information field or the terminal information field, or both the fields in the Group ID Management frame with space separation information, and notify space separation information such as the information on the order of the carrier patterns for each wireless terminal and the preamble patterns for the respective subcarriers. Note that if the preamble patterns are the same and fixed for all the wireless terminals and all the subcarriers, the notification may be omitted.

As a specific example of notification, information representing the correspondence between the subcarrier number and the preamble data to be allocated to the subcarrier may be notified in the common information field for each of the carrier patterns P1 to P4. Alternatively, information on the order of P1 to P4 may be notified in the terminal information fields of the respective wireless terminals.

The method of notification can be expanded or modified in various forms based on the same principle as the above embodiments. For example, besides the method of the explicit notification in the common information field and in the terminal information fields, implicit notification can be provided making use of the number of terminal information fields for each wireless terminal, the total number of transmission streams, or the like.

Note that, although the subcarriers f1 to f12 are used for transmitting the preamble patterns, this is merely one example, and more or less subcarriers may be used for transmitting the preamble patterns. In addition, the subcarriers to transmit the data section may be the same subcarriers that have been used for transmitting the preamble patterns, or may be subcarriers different therefrom. In the case of using different subcarriers, the access point 11 may predict and calculate the channel responses of the subcarriers for the subsequent data sections (MAC frame sections) from channel responses of the subcarriers for transmitting the preamble patterns, using any method. For example, channel responses of subcarriers nearest among the subcarriers for transmitting the preamble patterns which are nearest in terms of frequency may be employed for each of the subcarriers for the data sections.

Alternatively, transmitting preamble patterns at different timings by the wireless terminals enables the estimation of the channel response matrix of the uplink.

Figure 16:
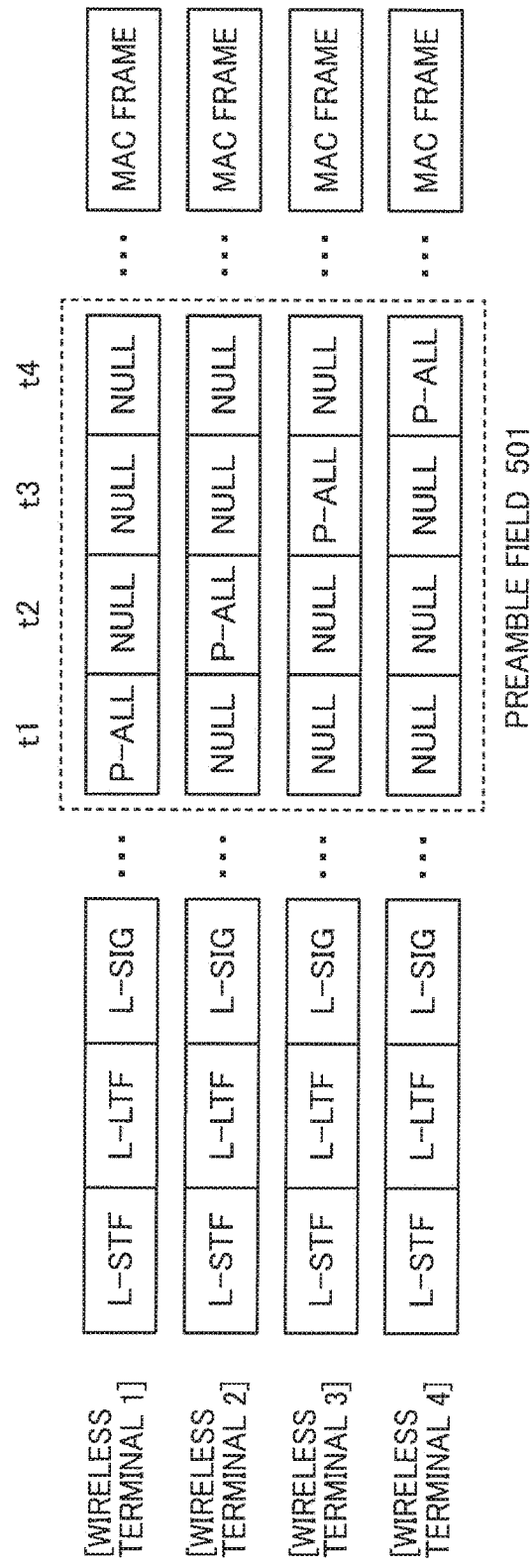
FIG. 16 is a diagram illustrating a schematic configuration example of BA frames transmitted in the uplink multiuser MIMO.

FIG. 16 shows a schematic configuration example of BA frames in the case where the preamble patterns are transmitted at different timings. A carrier pattern "P-ALL" means that the preamble patterns are transmitted using all the subcarriers f1 to f12 in OFDM modulation. "NULL" means that no preamble pattern is transmitted. The preamble patterns may be any patterns as long as they are known by the access point 11. By transmitting the preamble patterns by the wireless terminal 1 at a timing t1, by the wireless terminal 2 at t2, by the wireless terminal 3 at t3, and by the wireless terminal 4 at t4, the preamble patterns can be transmitted in the time orthogonal manner.

The access point 11 receives the preamble pattern from the wireless terminal 1 at the timing t1, from the wireless terminal 2 at t2, from the wireless terminal 3 at t3, from the wireless terminal 4 at t4. This allows the control unit 101 of the access point 11 to obtain the signals of all the frequency subcarriers f1 to f12 with respect to the wireless terminals 1 to 4, and to estimate the channel response matrix of the uplink.

As seen from the above, to cause the wireless terminals to transmit the preamble patterns at the different timings, the information such as the transmission timings and the preamble patterns for the wireless terminals (spatial separation information) needs to be notified to the wireless terminals.

As a method of the notification, as with the first to third embodiments, the control unit 101 of the access point 11 may MAC headers of the data frames 601 to 604, PHY headers thereof, or the common information field or the terminal information field, or both the fields in the Group ID Management frame with space separation information.

As described above, according to the present embodiment, the wireless terminals transmit the preamble patterns with the frequency carriers orthogonal to one another. In addition, the timings to transmit the preamble patterns by the wireless terminals are shifted. Thereby, the access point 11 can correctly estimate the channel response matrix of the uplinks.

Fifth Embodiment

In the present embodiment, the access point adjusts reception timings at which the wireless terminals transmit the BA frames in the uplink multiuser MIMO.

As described in the first embodiment, the wireless terminals transmit the BA frames after the lapse of the certain period of time (refer to T2 of FIG. 2) from receiving the data frames 604 to 604. If distances between the access point and the wireless terminals are identical, the access point basically receives the BA frames transmitted from the wireless terminals at the same timing.

However, the differences in distances between the access point and the wireless terminals result in differences in propagation times thereof, and therefore the longer a distance between the wireless terminal and the access point is, the greater a delay of the timing at which the data frame is received from the access point. In addition, the longer the distance between the wireless terminal from the access point, the greater a delay of the timing at which the access point receives the BA frames that the wireless terminals transmits after the lapse of the certain period of time from the reception of the data frames.

For this reason, when a maximum delay time difference between the access point and the wireless terminals in one direction is denoted by $\Delta t$, a time difference of up to $2 \times \Delta t$ occurs with respect to the timing at which the access point receives the BA frames from the wireless terminals. The time difference of $2 \times \Delta t$ within a guard interval of the OFDM or the like (it may be called a cyclic prefix) presents no problem. Note that the cyclic prefix can be used in a multicarrier modulation scheme other than the OFDM, or in a single-carrier modulation scheme, and the present embodiment is not limited to the OFDM.

However, the BA frames received from the wireless terminals with delay time differences exceeding the guard interval result in characteristic degradation of the uplink multiuser MIMO transmission.

Thus, in the present embodiment, the reception timings of the BA frames at the access point are adjusted. Specifically, the transmission timings of the BA frames at the wireless terminals are adjusted. The characteristic degradation of the uplink multiuser MIMO transmission due to delay time differences between the access point and the wireless terminals can be thereby prevented.

The control unit 101 of the access point 11 according to the present embodiment communicates in advance with the wireless terminals to estimate the delay times with respect to the wireless terminals, before transmitting the data frames 601 to 604. The method of the estimation may be any method, and various existing known arts can be used. For example, the access point 11 transmits a measurement frame, and the wireless terminals return frames each containing a reception time of the measurement frame. The control unit 101 of the access point 11 measures delay times from a difference between a point in time of transmitting the measurement frame and the reception time stored in the returned frame. As another example, the access point 11 transmits a measurement frame, receives response frames from the wireless terminals, and measures a delay time from a difference between a point in time of transmitting the measurement frame and a point in time of receiving the response frames. Various methods other than those described here can be used.

The control unit 101 of the access point 11 of the present embodiment specifies therewith the amounts of time adjustment used for adjusting the timings at which the wireless terminals transmit the BA frames, in the terminal information fields. The control unit 201 of each wireless terminal receives the terminal information field from the access point 11 according to the method explained in the first to thirds embodiments and moves up or puts off a transmission timing of the BA frame with respect to a reference timing on the basis of the amount of time adjustment notified in the terminal information field. The reference timing is, for example, a timing after the lapse of the certain period of time (refer to reference character T2 of FIG. 1) from the reception of the data frame. The wireless terminals transmit the BA frames at the adjusted transmission timings.

Here, the amounts of time adjustment of the wireless terminals set by the access point 11 are determined such that the timings of the reception of the BA frames from the wireless terminals fall within a certain range of time delay. The certain range of time delay is set within the guard interval. In order to set such amounts of time adjustment, the delay times estimated in advance with respect to each wireless terminal are used.

The amounts of time adjustment of the wireless terminals may be set using a relative time from the transmission timing of a reference wireless terminal. Here, with respect to the reference wireless terminal, a certain timing (e.g., after the lapse of the certain period of time from the reception of the data frame) can be set as the transmission timing. The wireless terminals other than the reference wireless terminal transmit the BA frames at the timings shifted only by the relative time from the transmission timing of the reference wireless terminal.

Here, the reference wireless terminal may be specified through any method. For example, the common information field may contain the specification of the reference wireless terminal.

Alternatively, the wireless terminal specified in a terminal information field having a predetermined number, such as the terminal information field 1, may be set as the reference wireless terminal.

As described above, according to the present embodiment, the access point 11 controls the transmission timings of the BA frames, which allows the timings of the reception of the BA frames from the wireless terminals to be within a certain range (such as the guard interval) regardless of communication delay times between the access point 11 and the wireless terminals.

Sixth Embodiment

The present embodiment has a feature in that the dynamic range of received powers with which the access point receives the BA frames from the wireless terminals is within a certain range.

As described in the embodiments thus far, the access point 11 receives the BA frames from the wireless terminals at the same time with the uplink multiuser MIMO. At this point, if the distances between the access point 11 and the wireless terminals are different from one another, the BA frames are received with the received powers, different from one another due to the difference between attenuation level of signals, even if transmission powers of the wireless terminals are identical.

Figure 17:
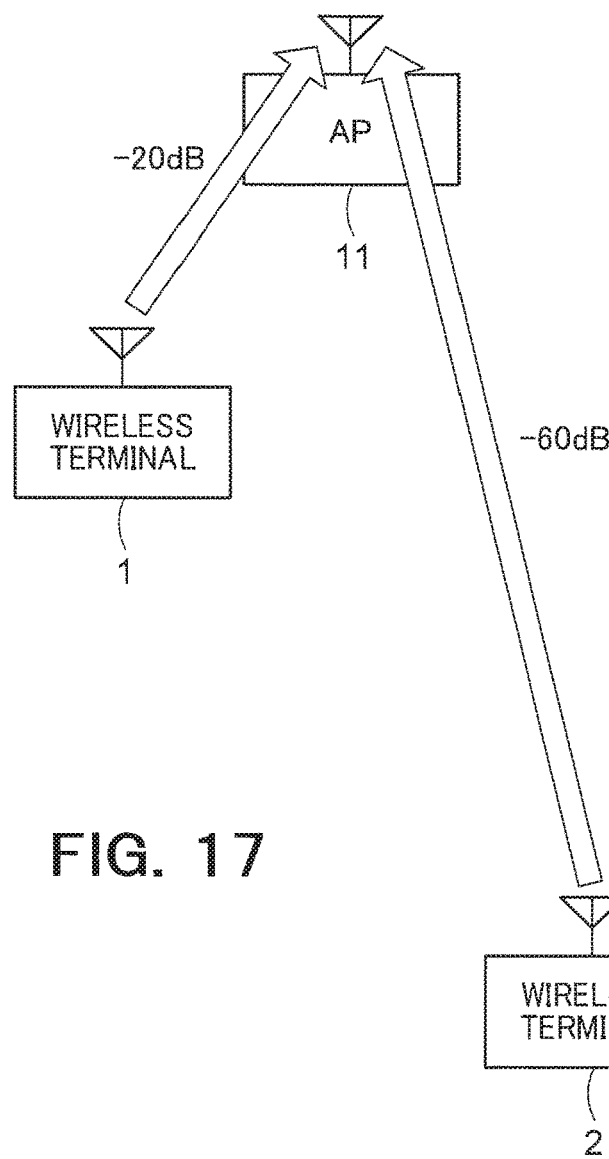
FIG. 17 is a diagram illustrating the distance relationship between wireless terminals and the access point.

FIG. 17 shows a situation where the wireless terminals 1 and 2 are disposed at a near position and at a far position with respect to the access point 11. In this example, the amount of distance attenuation from the wireless terminal 1 in the proximity of the access point 11 is 20 dB, and the amount of distance attenuation of the wireless terminal 2 disposed at the far position from the access point 11 is 60 dB. In this case, the access point 11 receives the BA frames at the same time, the difference between the received powers being 40 dB.

When an input dynamic range, which is a ratio or a difference between a maximum value and a minimum value of the received powers, increases, the frame of the smaller received power is buried in quantization noise in the AD conversion, which may prevent the frame from being properly received. To handle a large input dynamic range, an AD converter having a large quantization bit rate may be adopted, but the quantization bit rate has a limitation, and such an AD converter raises costs.

Thus, in the present embodiment, the above-described problem is solved by performing a control such that the dynamic range of the received powers of the BA frames received from the wireless terminals is within a certain range.

First, the control unit 101 of the access point 11 communicates in advance with the wireless terminals to estimate the amount of distance attenuation with respect to the wireless terminals, before transmitting the data frame. The method of the estimation may be any method, and various existing known arts can be used. For example, the control unit 101 of the access point 11 instructs the wireless terminals to transmit a frame with a specified transmission power, and estimates the amounts of distance attenuation (the amount of distance attenuation of the uplinks) from the received power value of the frames and the specified transmission power. Alternatively, the access point 11 transmits a measurement frame with a certain transmission power, and the wireless terminals return frames each containing a received power value of the measurement frame. The control unit 101 of the access point 11 estimates the amount of distance attenuation (the amounts of distance attenuation of the downlinks) on the basis of the transmission power value of the measurement frame and the received power values stored in the returned frames. For the purpose of the present embodiment, it is preferable to calculate the amounts of distance attenuation of the uplinks, but in an environment where there is no large difference between the amounts of distance attenuation of the downlink and the uplink, any one of the amounts of distance attenuation may be calculated.

The control unit 101 of the access point 11 determines the transmission powers of the wireless terminals such that the reception dynamic range of the BA frames transmitted from the wireless terminals being the targets of channel estimation is within a certain range, on the basis of the amounts of distance attenuation with respect to the wireless terminals. The dynamic range within the certain range is within the dynamic range that can be handled with the quantization bit rate of the AD converter installed in the access point 11.

The control unit 101 of the access point 11 specifies the wireless terminals to be the targets of channel estimation in the terminal information fields explained in the above embodiments, and sets the information on the transmission power that has been determined for the wireless terminals (transmission power information). The transmission power information may be actually represented by values of the transmission power with which the wireless terminals should perform the transmission, or may be represented by a relative value with respect to a transmission power (normal transmission power) used in normal transmission.

In the above description, the transmission powers of the wireless terminals are determined by the access point 11, but a configuration may be employed in which the wireless terminals determine the transmission powers thereof. An example of such configuration will be described below.

As a first example, the control unit 101 of the access point 11, the amounts of distance attenuation estimated for the wireless terminals are notified to the wireless terminals in the terminal information fields of the data frame. The control unit 201 of each wireless terminal determines the transmission power of the BA frame in accordance with the amount of distance attenuation notified in the terminal information field. For example, the transmission powers are determined such that the received powers of the BA frames at the access point 11 are made to be a specified value or within a specified range. In this case, a value or a range of the received power expected by the access point 11 may be notified in the common information field of the data frame 601 to 604. If the value or the range of the received power expected by the access point 11 is predetermined, the notification may be omitted.

As a second example, the control unit 101 of the access point 11 sets the value of the transmission power for the data frame and the value of the power of the BA frames received from the wireless terminals expected by the access point 11 (expected received power value), to the common information field in the data frame. The control unit 101 of the access point 11 transmits the data frame, set in such a manner, with the value of the transmission power set in the common information field. Note that, if the value of the transmission power of the data frame or the expected received power of the BA frame is a predetermined fixed value, the control unit 101 of the access point 11 may omit the notification of these values.

The control unit 201 of each wireless terminal that has received the data frame from the access point 11 measures the received power of the data frame. The control unit 201 of each wireless terminal detects the amount of distance attenuation from the access point 11 to the wireless terminal on the basis of the measured value of the received power and the value of the transmission power notified in the common information field.

The control unit 201 of each wireless terminal determines the transmission power of the BA frame such that the value of the received power of the BA frame equals the expected received power value notified with the data frame at the access point 11, on the basis of the detected amount of distance attenuation. The control unit 201 of each wireless terminal performs a control so as to transmit the BA frame with the determined transmission power. Note that, although the amount of distance attenuation of the downlink from the access point 11 to the wireless terminal and the amount of distance attenuation of the uplink from the wireless terminal to the access point 11 are not necessarily strictly identical depending on communication environment, such a method can be used in an environment in which they are considered to be substantially identical. Alternatively, the amount of distance attenuation of the uplink can be estimated by adjusting the amount of distance attenuation of the downlink by multiplying a coefficient thereto by any manner.

Although in the present embodiment, description is made about how the access point 11 adjusts received power values using data frames, the Group ID Management frame with spatial separation information in the second embodiment or the other frames can be used.

As described above, according to the present embodiment, the access point controls the transmission power with which the wireless terminals transmits the BA frames, which allows for the BA frames transmitted from the wireless terminals to be received in such a manner that the values of the received powers are within the certain dynamic range at the access point.

Seventh Embodiment

The present embodiment considers the case of performing OFDM transmission between the access point and the wireless terminal. In the OFDM transmission, it is necessary to maintain orthogonality between subcarriers in order to prevent interference between subcarriers. To maintain orthogonality between subcarriers, an accurate frequency synchronization is required between a transmission-side device and a reception-side device, but frequency offset can occur in a subcarrier group between the transmission device and the reception device, due to deviations of oscillatory frequencies or the Doppler shift. This has an impact on worsening the characteristics of the OFDM transmission.

In particular, in the case of the uplink multiuser MIMO transmission, the access point receives frames at the same time from a plurality of wireless terminals. The access point may therefore receive, for each wireless terminal, frames having different frequency offsets, at the same time. In this case, the frequency offsets more likely lead to characteristics degradation, as compared with a normal transmission (transmission of a single data stream).

Thus, the present embodiment is intended to reduce the characteristic degradation in the uplink multiuser MIMO transmission, through a control performed by the access point such that the frequency offsets in the subcarriers of the wireless terminals are within a certain range with respect to used frequencies (reference frequencies) of the subcarriers.

First, the control unit 101 of the access point 11 communicates in advance with the wireless terminals being the targets of channel estimation to estimate the amounts of frequency offset of the subcarriers thereof, before transmitting the data frames 601 to 604. The method of estimation may by any method, and various existing known arts can be used. For example, the access point 11 transmits a subcarrier group of the used frequency to the wireless terminals, and the wireless terminals return frames storing reception frequencies of the subcarriers. The control unit 101 of the access point 11 compares the transmission frequency and the reception frequencies written in the returned frames to estimate the amounts of frequency offset in the subcarriers. Alternatively, the access point 11 instructs the wireless terminals to transmit a subcarrier group of the used frequency, and the control unit 101 of the access point 11 estimates the amounts of frequency offset of the subcarriers through comparison of the frequencies of the subcarrier group received from the wireless terminals with the used frequency. If the frequency offset of the subcarriers can be considered to be identical or within a certain range, the amount of offset of a center frequency of the OFDM signal (a center frequency of a channel bandwidth) may be estimated instead of calculating the frequency offset for each subcarrier.

The control unit 101 of the access point 11 determines the amounts of frequency correction for the wireless terminals on the basis of the amounts of frequency offset of the subcarriers estimated for the wireless terminals. The amounts of frequency correction are determined such that the frequency offset of the subcarriers at the time when the access point 11 receives the BA frames from the wireless terminals are identical or within a certain range with respect to the respective used frequencies. The used frequencies may be fixedly set in advance in the access point 11 and in the wireless terminals, or a configuration can be employed in which the access point 11 determines the used frequencies and notifies them to the wireless terminals.

The control unit 101 of the access point 11 specifies pieces of information on the amounts of frequency correction of the subcarriers that have been determined (frequency correction information), in the terminal information fields of the data frames 601 to 604.

The frequency correction information may be represented by an absolute amount of correction indicating how much the frequency is shifted, or may be represented by a relative amount of correction indicating how much the frequency is shifted with respect to the value of the frequency of the reference wireless terminal.

If the frequency correction information is the absolute amount of correction, the control unit 201 of each wireless terminal performs a control so as to shift the frequencies of the subcarriers by the specified amounts of correction. The BA frame is generated through modulation based on the shifted subcarriers.

If the frequency correction information is the relative amount of correction with respect to the reference wireless terminal, the control unit 201 of the wireless terminals other than the reference wireless terminal performs a control so as to shift the frequencies thereof with respect to the shifted frequency of the reference wireless terminal by the relative amount of correction. The BA frames are generated through modulation based on the shifted subcarriers. Note that the absolute amount of correction is specified for the reference wireless terminal. The wireless terminals other than the reference wireless terminal can detect the shifted frequency of the reference wireless terminal on the basis of the absolute amount of correction of the reference wireless terminal.

Here, the reference wireless terminal may be shifted by any method. For example, the common information field may contain the specification of the reference wireless terminal. Alternatively, the wireless terminal specified in a terminal information field having a predetermined number, such as the terminal information field 1, may be specified as the reference wireless terminal.

Although the above description illustrates the case where the frequencies are adjusted from one subcarrier to another, if the offset of the subcarriers can be considered to be identical or within a certain range, the frequencies may be corrected by the same amount as a whole. In this case, the control unit 101 of the access point 11 does not calculate in advance the frequency offset for each subcarrier, but may determine the amount of correction on the basis of deviation between the center frequency (center frequency of the channel bandwidth) of the received OFDM signal and the reference center frequency. The wireless terminals may shift the whole subcarriers by the same amount of frequency so as to shift the center frequency of the channel bandwidth.

Although in the present embodiment, description is made about how the access point 11 adjusts frequencies using data frames, the Group ID Management frame with spatial separation information in the second embodiment or the other frames can be used.

As seen from the above, according to the present embodiment, the access point controls frequencies at which the wireless terminals transmit the BA frames, which enables the correction of frequency offsets of subcarriers used by the wireless terminals.

Eighth Embodiment

Description will be made about modifications of the embodiments previously described.

In the present modification, the components across different embodiments previously described may be combined as appropriate. For example, the Group ID Management frame with spatial separation information, and the MAC header and the PHY header of a data frame can be used in combination for the transmission of the spatial separation information.

In addition, the spatial separation information is information necessary to spatially separate BA frames transmitted in uplink multiuser MIMO and at the same time, information about the method of transmitting the BA frames in the uplink multiuser MIMO. The access point 11 can store the spatial separation information in fields other than the common information field and the terminal information field. In addition, the wireless terminals may acquire the spatial separation information from a field other than the common information field and the terminal information field (e.g., a field defined in a legacy standard).

Although there is described the case where the access point 11 specifies the preamble patterns to use to the wireless terminals, another form may be employed as a modification in which the wireless terminals each use fixed preamble patterns. In this case, the access point 11 may always specify a set of the wireless terminals having the orthogonal preamble patterns when intending to perform the downlink multiuser MIMO transmission. In addition, if a variable spatial number of multiplexing is allowed, the wireless terminals may be configured to use preamble patterns in accordance with the spatial number of multiplexing, and the access point 11 may notify the information to specify the spatial number of multiplexing to the wireless terminals.

A terminal information field may be provided for each wireless terminal transmitting a BA frame. In the example illustrated in FIG. 2, the number of provided terminal information fields is four. That is, there are provided a terminal information field 1, a terminal information field 2, a terminal information field 3, and a terminal information field 4. In this case, in the terminal information fields, identification information on each wireless terminal and the spatial separation information to be notified to the wireless terminal can be stored.

The row numbers (or the column numbers) to be used by the wireless terminals can be notified by an implicit method. There is a method of indirectly notifying a row number (or column number), for example, with the field number of the terminal information field as an implicit notification. For example, the wireless terminal specified with the terminal information field 1 (i.e., the wireless terminal of which identification information is set in the terminal information field 1) uses the first row in the orthogonal matrix, the wireless terminal specified with the terminal information field 2 uses the second row in the orthogonal matrix, . . . , and the wireless terminal specified with the terminal information field n uses the n-th row in the orthogonal matrix.

Figure 23:
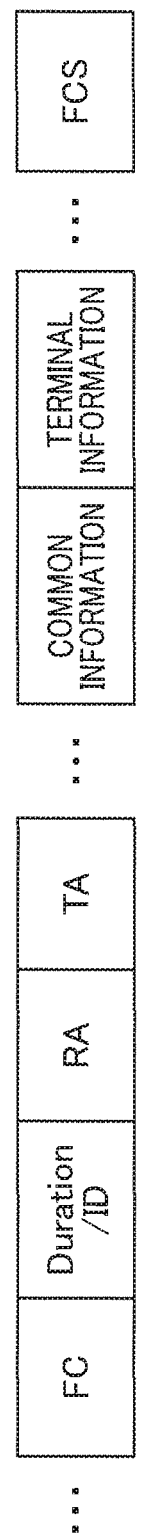
FIG. 23 is a diagram illustrating a format example of a trigger frame.
Figure 24:
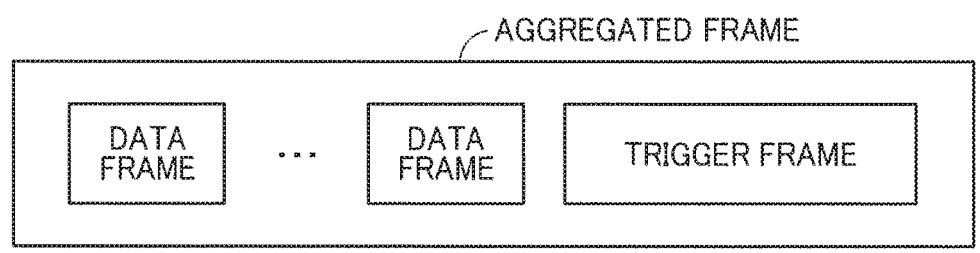
FIG. 24 is a diagram schematically illustrating the configuration of an aggregated frame that is the aggregation of data frames and the trigger frame.

In addition, in the previously described embodiments, the spatial separation information such as preamble patterns is contained in the plurality of data frames 601 to 604 to be transmitted in the downlink multiuser MIMO. More in details, the spatial separation information is notified using the common information field or the terminal information field in the MAC header (or the PHY header) of each of the data frames 601 to 604. As another method, it is allowed that the spatial separation information is set to a single dedicated frame (here, referred to as a trigger frame), in the downlink multiuser MIMO transmission, an aggregated frame that is the aggregation of one or more data frames and the trigger frame is generated for each terminal, and these aggregated frames are transmitted in the downlink multiuser MIMO. That is, the common information field and the terminal information field are removed from the MAC header or the PHY header illustrated in FIG. 3 or FIG. 4, and these fields are provided in a dedicated frame as the trigger frame. The configuration example of the trigger frame is as illustrated in FIG. 23. The common information field and the terminal information field may lie in a frame body field or in the MAC header. In addition, the common information field and the terminal information field may be allowed to be disposed in the physical header. In the frame control (FC) field, "Control" may be set to a type field, and a newly defined value may be set to a subtype field. Alternatively, it is possible to use a value defined in an existing standard for the subtype field, and to set the common information field and the terminal information field to a reserved area in a frame defined in the existing standard. In addition, FIG. 24 schematically illustrates the configuration of an aggregated frame that is the aggregation of data frames and the trigger frame. The aggregated frame is configured by coupling the plurality of data frames and the trigger frame with one another with delimiters (not illustrated). The number of data frames may be one. RA of the trigger frame may be the MAC address of a terminal being a reception destination.

A plurality of aggregated frames transmitted from the access point in the downlink multiuser MIMO are received by relevant terminals, respectively. Each terminal performs CRC check on one or more data frames in the aggregated frame and acquires the spatial separation information from the trigger frame. The subsequent processes are the same as those in the embodiments thus far. For example, each terminal generates a BA frame based on the result of the CRC check, sets a preamble pattern in accordance with the spatial separation information to a preamble field of a physical header, and transmits a BA frame with the physical header added thereto to the access point after a time T1 from the completion of receiving the aggregated frame. Alternatively, as another operation example, the terminal may transmit an aggregated frame that is the aggregation of the BA frame and another frame. The other frame may be a data frame or a different frame such as a management frame. In this case, the access point may set information on the length of packets to be transmitted by terminals to the common information field or the terminal information field of the trigger frame so that the lengths of packets (e.g., a physical layer convergence protocol data unit (PPDU) length) transmitted from the terminals become identical. If the length of a frame is less than the specified packet length, padding data may be appended to the frame.

In addition, although in the previously described embodiments, the downlink multiuser MIMO transmission is performed as a downlink multiuser transmission system, it is allowed that the downlink transmission is performed using another scheme, and in response to this, BA frames may be transmitted from a plurality of terminals in the uplink multiuser MIMO. For example, as another communication scheme, there is a frequency multiplexing communication scheme in which transmissions to the plurality of terminals are simultaneously performed, by using a plurality of frequency components different among the terminals as communication resources. Specifically, there is OFDMA (Orthogonal Frequency Division Multiple Access) scheme in which each of a plurality of resource units each including one or more sub-carriers are defined as a frequency component and transmissions to the plurality of terminals or receptions from the plurality of terminals are simultaneously performed by using each of the resource units as a smallest unit of a communication resource. The simultaneous transmission from the access point to the plurality of terminals corresponds to downlink(DL)-OFDMA, whereas the simultaneous transmission from the plurality of terminals to the access point corresponds to uplink(UL)-OFDMA.

Figure 25:
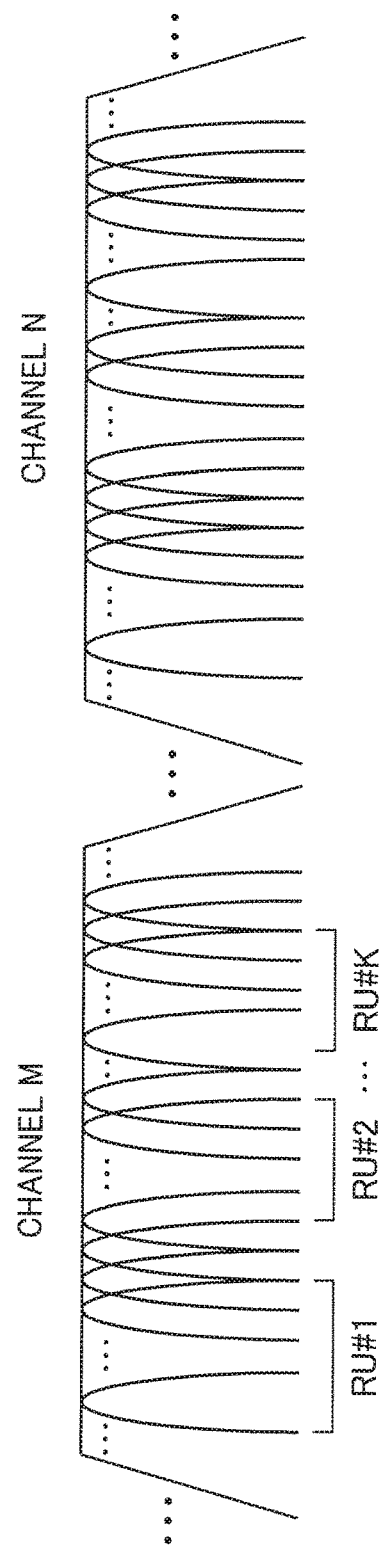
FIG. 25 is a diagram for illustrating an example of a plurality of resource units secured in one channel.

FIG. 25 illustrates the resource units (RU#1, RU#2 . . . RU#K) arranged within a continuous frequency domain of one channel (which is described here as the channel M). A plurality of subcarriers orthogonal to each other are arranged in the channel M, and a plurality of resource units including one or a plurality of continuous subcarriers are defined within the channel M. Although one or more subcarriers (guard subcarriers) may be arranged between the resource units, presence of the guard subcarrier is not essential. A number for identification of the subcarrier or the resource unit may be assigned to each carrier or each resource unit in the channel. The bandwidth of one channel may be for example, though not limited to these, 20 MHz, 40 MHz, 80 MHz, and 160 MHz. One channel may be constituted by combining a plurality of channels of 20 MHz. The number of subcarriers in the channel or the number of resource units may vary in accordance with the bandwidth. Uplink OFDMA communication or downlink OFDMA is realized by different resource units being simultaneously used by different terminals.

In the case of the downlink multiuser MIMO, the data streams of the wireless terminals are spatially separated by beamforming, but in the case of downlink OFDMA, resource units are orthogonal to one another in terms of frequency, and different resource units do not interfere with each other. Therefore, the access point may transmit data frames (or an aggregated frame that is the aggregation of one or more data frames) using a resource unit different for each terminal. At this point, it is allowed that information specifying a resource unit to be decoded for each terminal is set to a predetermined field in the physical header of each of these data frames (aggregated frame) (here, referred to as a SIG field), and the terminals decodes a resource unit specified by the information. The SIG field may be transmitted using a channel bandwidth as with the L-STF, L-LTF, and LSIG described with reference to FIG. 5 so that all the plurality of terminals receiving the SIG field can decode in common. The identifier of a terminal used in the SIG field may be an association ID (AID) given in association from the access point or a part of the AID (Partial AID), or may be another identifier such as a MAC address.

In addition, as in the modification previously described, in the downlink OFDMA transmission, an aggregated frame that is the aggregation of one or more data frames and the trigger frame is generated for each terminal, and these aggregated frames may be transmitted in the downlink OFDMA. The configuration of the trigger frame may be the same as in FIG. 24 described previously.

In addition, in the previously described embodiments, a plurality of BA frames are transmitted from the plurality of terminals to the access point in the uplink multiuser MIMO. However, as another multiuser transmission scheme, the BA frames may be transmitted in the uplink OFDMA. In this case, the plurality of terminals use different resource units to transmit the BA frames simultaneously. To perform the uplink OFDMA, in the downlink multiuser transmission (downlink multiuser MIMO or downlink OFDMA), information specifying a resource unit to be used in uplink OFDMA may be notified for each terminal using the previously described common information field or terminal information field, rather than the preamble patterns.

Besides, in the multiuser transmission of a plurality of BA frames from the plurality of terminals to the access point, a communications scheme that is the combination of OFDMA and multiuser MIMO (is called OFDMA & MU-MIMO) can be used. In this case, the uplink multiuser MIMO transmission is performed for each resource unit to be used. That is, two or more of the plurality of terminals are assigned to the same single resource unit, and in the same resource unit, the two or more terminals perform the uplink multiuser MIMO transmission. There may be a case where only one terminal is assigned to one resource unit. To perform the uplink OFDMA & MU-MIMO, in the downlink multiuser transmission (downlink multiuser MIMO or downlink OFDMA), the spatial separation information may be notified for each terminal using the previously described common information field or terminal information field, and information specifying a resource unit to be used in the uplink OFDMA & MU-MIMO may be notified for each terminal. In this case, an identical preamble pattern can be used among different resource units.

Ninth Embodiment

Figure 18:
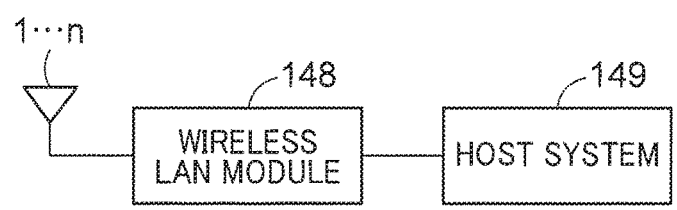
FIG. 18 is a diagram illustrating a general configuration example of an access point or a terminal according to a ninth embodiment.

FIG. 18 shows an example of entire configuration of a terminal or an access point (base station). The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to any of the embodiments. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, and so on.

Figure 19:
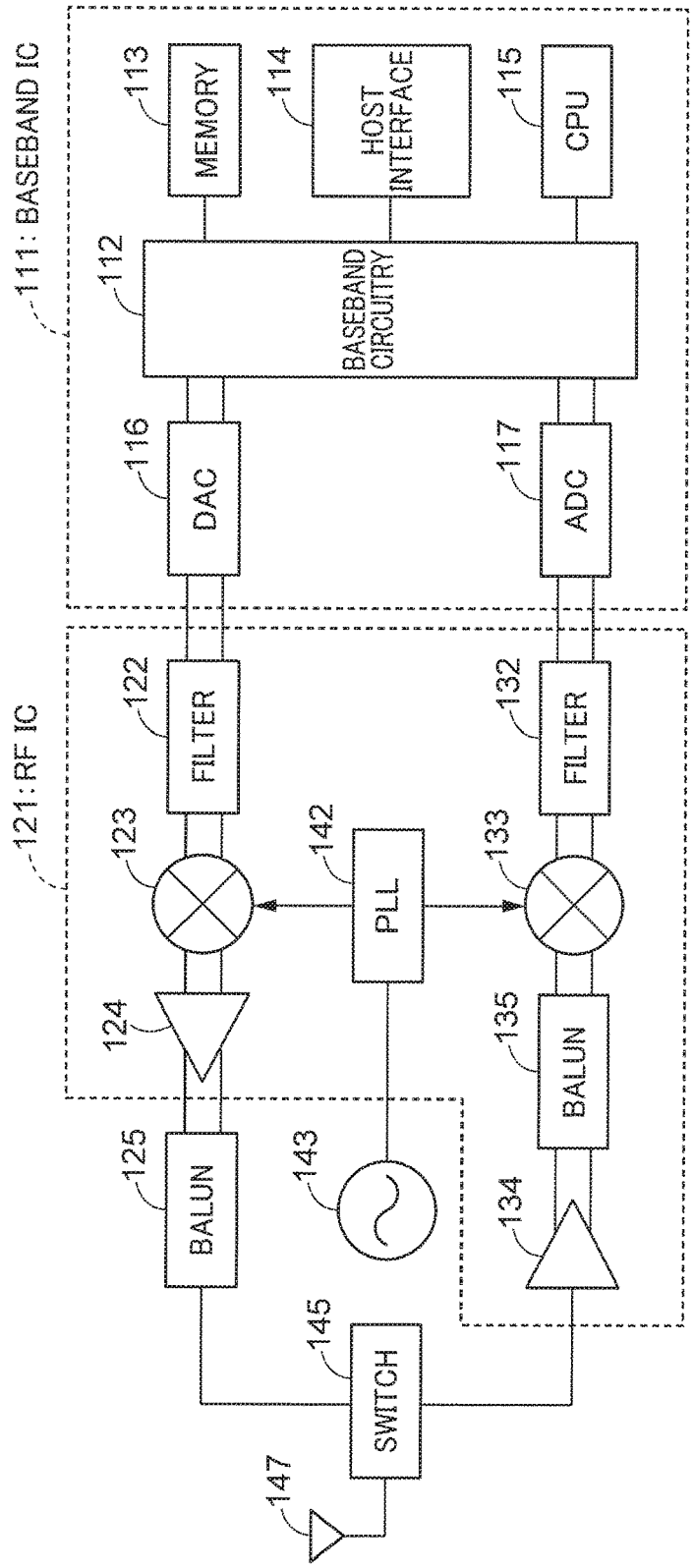
FIG. 19 is a diagram illustrating a hardware configuration example of a wireless communication device built in an access point or a wireless terminal according to the ninth embodiment.

FIG. 19 shows an example of hardware configuration of a wireless LAN module. The configuration can also be applied when the wireless communication device is mounted on either one of the terminal that is a non-base station and the base station. Therefore, the configuration can be applied as an example of specific configuration of the wireless communication device shown in FIG. 7 or FIG. 8. At least one antenna 147 is included in the example of configuration. When a plurality of antennas are included, a plurality of sets of a transmission system (116 and 122 to 125), a reception system (117, 132 to 135), a PLL 142, a crystal oscillator (reference signal source) 143, and a switch 145 may be arranged according to the antennas, and each set may be connected to a control circuit 112. The plurality of antennas and the plurality of the sets are used in a case that the access point (base station) carries out a multiuser MIMO or OFDMA&MU-MIMO.

The wireless LAN module (wireless communication device) includes a baseband IC (Integrated Circuit) 111, an RF (Radio Frequency) IC 121, a balun 125, the switch 145, and the antenna 147.

The baseband IC 111 includes the baseband circuit (control circuit) 112, a memory 113, a host interface 114, a CPU 115, a DAC (Digital to Analog Converter) 116, and an ADC (Analog to Digital Converter) 117.

The baseband IC 111 and the RF IC 121 may be formed on the same substrate. The baseband IC 111 and the RF IC 121 may be formed by one chip. Both or one of the DAC 116 and the ADC 117 may be arranged on the RF IC 121 or may be arranged on another IC. Both or one of the memory 113 and the CPU 115 may be arranged on an IC other than the baseband IC.

The memory 113 stores data to be transferred to and from the host system. The memory 113 also stores one or both of information to be transmitted to the terminal or the base station and information transmitted from the terminal or the base station. The memory 113 may also store a program necessary for the execution of the CPU 115 and may be used as a work area for the CPU 115 to execute the program. The memory 113 may store space separation information or the like. The memory 113 may be a volatile memory, such as an SRAM or a DRAM, or may be a non-volatile memory, such as a NAND or an MRAM.

The host interface 114 is an interface for connection to the host system. The interface can be anything, such as UART, SPI, SDIO, USB, or PCI Express. The CPU 115 is a processor that executes a program to control the baseband circuit 112. The baseband circuit 112 mainly executes a process of the MAC layer and a process of the physical layer. One or both of the baseband circuit 112 and the CPU 115 correspond to the communication control apparatus that controls communication, the controller that controls communication, or controlling circuitry that controls communication.

At least one of the baseband circuit 112 or the CPU 115 may include a clock generator that generates a clock and may manage internal time by the clock generated by the clock generator. For the process of the physical layer, the baseband circuit 112 performs addition of the physical header, coding, encryption, modulation process, and the like of the frame to be transmitted and generates, for example, two types of digital baseband signals (hereinafter, "digital I signal" and "digital Q signal"). In a case of MIMO transmission, two types of digital baseband signals are generated corresponding to each stream. The baseband circuit 112 may carry out processing relating to MIMO such as processing of channel estimation or calculation processing of transmission weights and reception weights.

The DAC 116 performs DA conversion of signals input from the baseband circuit 112. More specifically, the DAC 116 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 121 is, for example, one or both of an RF analog

IC and a high frequency IC. The RF IC 121 includes a filter 122, a mixer 123, a preamplifier (PA) 124, the PLL (Phase Locked Loop) 142, a low noise amplifier (LNA) 134, a balun 135, a mixer 133, and a filter 132. Some of the elements may be arranged on the baseband IC 111 or another IC. The filters 122 and 132 may be bandpass filters or low pass filters.

The filter 122 extracts a signal of a desired band from each of the analog I signal and the analog Q signal input from the DAC 116. The PLL 142 uses an oscillation signal input from the crystal oscillator 143 and performs one or both of division and multiplication of the oscillation signal to thereby generate a signal at a certain frequency synchronized with the phase of the input signal. Note that the PLL 142 includes a VCO (Voltage Controlled Oscillator) and uses the VCO to perform feedback control based on the oscillation signal input from the crystal oscillator 143 to thereby obtain the signal at the certain frequency. The generated signal at the certain frequency is input to the mixer 123 and the mixer 133. The PLL 142 is equivalent to an example of an oscillator that generates a signal at a certain frequency.

The mixer 123 uses the signal at the certain frequency supplied from the PLL 142 to up-convert the analog I signal and the analog Q signal passed through the filter 122 into a radio frequency. The preamplifier (PA) amplifies the analog I signal and the analog Q signal at the radio frequency generated by the mixer 123, up to desired output power. The balun 125 is a converter for converting a balanced signal (differential signal) to an unbalanced signal (single-ended signal). Although the balanced signal is handled by the RF IC 121, the unbalanced signal is handled from the output of the RF IC 121 to the antenna 147. Therefore, the balun 125 performs the signal conversions.

The switch 145 is connected to the balun 125 on the transmission side during the transmission and is connected to the LNA 134 or the RF IC 121 on the reception side during the reception. The baseband IC 111 or the RF IC 121 may control the switch 145. There may be another circuit that controls the switch 145, and the circuit may control the switch 145.

The analog I signal and the analog Q signal at the radio frequency amplified by the preamplifier 124 are subjected to balanced-unbalanced conversion by the balun 125 and are then emitted as radio waves to the space from the antenna 147.

The antenna 147 may be a chip antenna, may be an antenna formed by wiring on a printed circuit board, or may be an antenna formed by using a linear conductive element.

The LNA 134 in the RF IC 121 amplifies a signal received from the antenna 147 through the switch 145 up to a level that allows demodulation, while maintaining the noise low. The balun 135 performs unbalanced-balanced conversion of the signal amplified by the low noise amplifier (LNA) 134. The mixer 133 uses the signal at the certain frequency input from the PLL 142 to down-convert, to a baseband, the reception signal converted to a balanced signal by the balun 135. More specifically, the mixer 133 includes a unit that generates carrier waves shifted by a phase of 90 degrees based on the signal at the certain frequency input from the PLL 142. The mixer 133 uses the carrier waves shifted by a phase of 90 degrees to perform quadrature demodulation of the reception signal converted by the balun 135 and generates an I (In-phase) signal with the same phase as the reception signal and a Q (Quad-phase) signal with the phase delayed by 90 degrees. The filter 132 extracts signals with desired frequency components from the I signal and the Q signal. Gains of the I signal and the Q signal extracted by the filter 132 are adjusted, and the I signal and the Q signal are output from the RF IC 121.

The ADC 117 in the baseband IC 111 performs AD conversion of the input signal from the RF IC 121. More specifically, the ADC 117 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 112 executes a process of the physical layer and the like, such as demodulation process, error correcting code process, and process of physical header, and obtains a frame. The baseband circuit 112 applies a process of the MAC layer to the frame. Note that the baseband circuit 112 may be configured to execute a process of TCP/IP when the TCP/IP is implemented.

The control circuit 112 may execute a process regarding the MIMO. The control circuit 112 may execute at least one or a plurality of a process of channel estimation, a transmission weight calculation process, a generation process of a stream, a separation process of stream, and the like. The control circuit 112 carries out processing relating to at least one of UL-OFDMA, UL-MU-MIMO or UL-OFDMA&MU-MIMO.

The further explanation on processing of the above each block is omitted as being apparent from the explanation of FIG. 7 and FIG. 8

Tenth Embodiment

Figure 20:
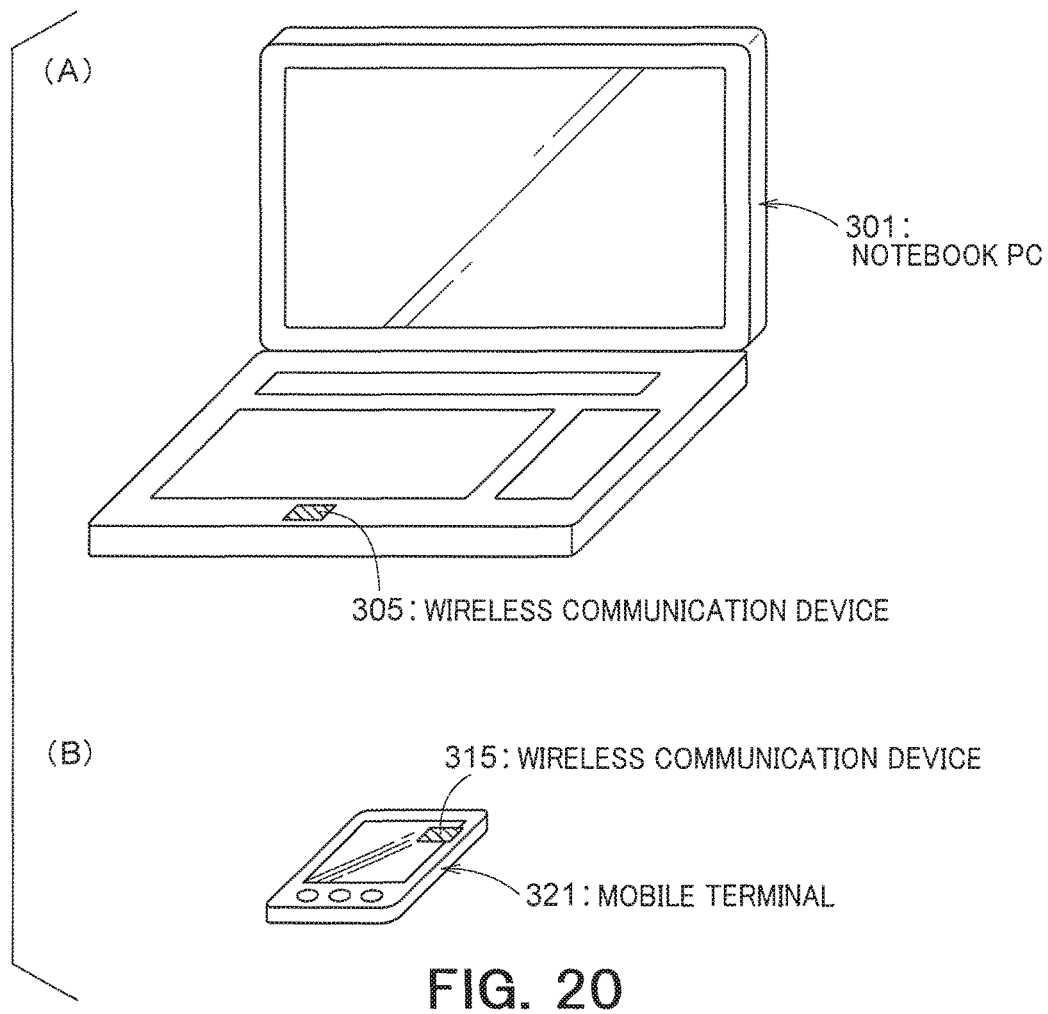
FIG. 20 shows perspective views of a wireless terminal according to a tenth embodiment.

FIG. 20(A) and FIG. 20(B) are perspective views of wireless terminal according to the fourth embodiment. The wireless terminal in FIG. 20(A) is a notebook PC 301 and the wireless communication device in FIG. 20(B) is a mobile terminal 321. Each of them corresponds to one form of a terminal. The notebook PC 301 and the mobile terminal 321 are equipped with wireless communication devices 305 and 315, respectively. The wireless communication device provided in a terminal (see FIGS. 8 and 19 etc.) or the wireless communication device provided in an access point 11 (see FIGS. 7 and 18 etc.), which has been described above can be used as the wireless communication devices 305 and 315. A wireless terminal carrying a wireless communication device is not limited to notebook PCs and mobile terminals. For example, it can be installed in a smart phone, tablet, TV, a digital camera, a wearable device and so on. It may be a mobile device but not a laptop device.

Figure 21:
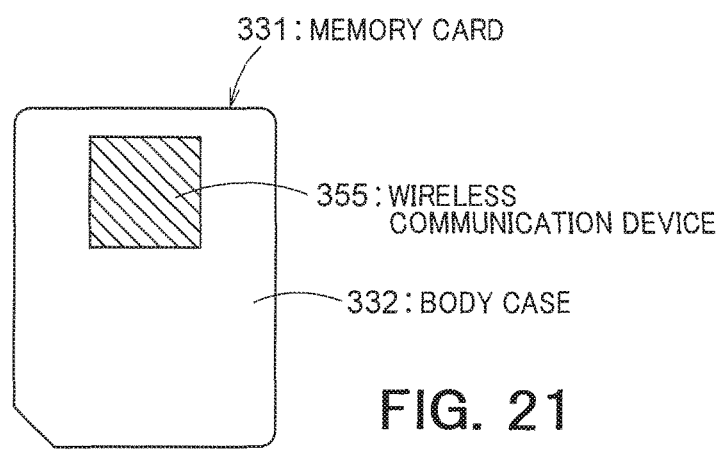
FIG. 21 is a diagram illustrating a memory card according to the tenth embodiment.

Moreover, a wireless communication device installed in a terminal or a access point 11 can also be provided in a memory card. FIG. 21 illustrates an example of a wireless communication device mounted on a memory card. A memory card 331 contains a wireless communication device 355 and a body case 332. The memory card 331 uses the wireless communication device 355 for wireless communication with external devices. Here, in FIG. 21, the description of other installed elements (for example, a memory, and so on) in the memory card 331 is omitted.

Eleventh Embodiment

In the eleventh embodiment, a bus, a processor unit and an external interface unit are provided in addition to the configuration of the wireless communication device (see FIGS. 7 and 8) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware.

Twelfth Embodiment

In the twelfth embodiment, a clock generating unit is provided in addition to the configuration of the wireless communication device (which may indicate the wireless communication device mounted in the terminal, or the wireless communication device mounted in the access point 11) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Thirteenth Embodiment

In the thirteenth embodiment, a power source unit, a power source controlling unit and a wireless power feeding unit are included in addition to the configuration of the wireless communication device (which may indicate the wireless communication device mounted in the terminal, or the wireless communication device mounted in the access point) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Fourteenth Embodiment

In the fourteenth embodiment, a SIM card is added to the configuration of the wireless communication device according to the above embodiments. For example, the SIM card is connected with the transmitter (102 or 202), the receiver (103 or 203), or the controller (101 or 201). Thus, by adopting a configuration in which the SIM card is included in the wireless communication device, authentication processing can be easily performed.

Fifteenth Embodiment

In the ninth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Sixteenth Embodiment

In the sixteenth embodiment, an LED unit is added to the configuration of the wireless communication device (which may indicate the wireless communication device mounted in the terminal, or the wireless communication device mounted in the access point) according to any of the above embodiments. For example, the LED unit is connected to the transmitter (102 or 202), the receiver (103 or 203), or the controller (101 or 201). Thus, by adopting a configuration in which the LED unit is included in the wireless communication device, notifying the operation state of the wireless communication device to the user can be easily done.

Seventeenth Embodiment

In the seventeenth embodiment, a vibrator unit is included in addition to the configuration of the wireless communication device (which may indicate the wireless communication device mounted in the terminal, or the wireless communication device mounted in the access point) according to any of the above embodiments. For example, the vibrator unit is connected to the transmitter (102 or 202), the receiver (103 or 203), or the controller (101 or 201). Thus, by adopting a configuration in which the vibrator unit is included in the wireless communication device, notifying the operation state of the wireless communication device to the user can be easily done.

Eighteenth Embodiment

In the eighteenth embodiment, the configuration of the wireless communication device includes a display in addition to the configuration of the wireless communication device (which may indicate the wireless communication device mounted in the terminal, the wireless communication device mounted in the access point) according to any one of the above embodiments. The display may be connected to the transmitter (102 or 202), the receiver (103 or 203), or the controller (101 or 201). As seen from the above, the configuration including the display to display the operation state of the wireless communication device on the display allows the operation status of the wireless communication device to be easily notified to a user.

Nineteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames handled on a wireless access protocol in a wireless communication system are roughly divided into the three types of the data frame, the management frame and the control frame. These types are normally shown in a header part which is commonly provided to frames. As a display method of the frame type, the three types may be distinguished in one field or may be distinguished by a combination of two fields.

The management frame is a frame used to manage a physical communication link with another wireless communication device. For example, there are frames used to perform communication settings with the other wireless communication device or a frame to release communication links (that is, to disconnect the connection), and a frame related to power saving operations in the wireless communication device.

The data frame is a frame to transmit data generated in the wireless communication device to the other wireless communication device after a physical communication link with the other wireless communication device is established. The data is generated in a higher layer of the present embodiment and generated by, for example, a user's operation.

The control frame is a frame used to perform control at the time of transmission and reception (exchange) of the data frame with the other wireless communication device. A response frame, transmitted as acknowledgment in a case where the wireless communication device receives the data frame or the management frame, belongs to the control frame.

These three types of frames are subjected to processing as necessary in the physical layer and then transmitted as physical packets via an antenna. Here, in a procedure of establishing connection, a connection request frame and a connection reception frame are management frames, and it is possible to use the response frame of the control frame as a confirmation frame with respect to the connection reception frame.

[2] Procedure of Disconnecting Wireless Communication Devices

For disconnecting follows an explicit procedure and an implicit procedure. According to the explicit procedure, a frame to disconnect any one of the connected wireless communication devices is transmitted. This frame is classified as a management frame. The frame for disconnecting may be, for example, referred to as "a release frame" meaning it releases connection. Normally, it is determined that the connection is disconnected at the time of transmitting the release frame in a wireless communication device on the transmission side and at the time of receiving the release frame in a wireless communication device on the reception side. Afterward, it returns to the initial state in a communication phase, for example, a state of searching a wireless communication device of the communicating partner. This is because, at the time of transmitting the frame for disconnecting, a physical wireless link may not be secured due to, for example, the communication distance to the wireless communication device target of connection is considerable and radio signals cannot be received or decoded.

On the other hand, according to the implicit procedure, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a procedure is provided because, in a state where it is determined that the connection is disconnected as mentioned above, a state is considered where the physical wireless link cannot be secured due to, for example, the communication distance to the wireless communication device target of connection is considerable and radio signals cannot be received or decoded. That is, it is because the reception of the release frame cannot be expected.

As a specific example of determining the disconnection of connection in an implicit manner, a timer is used. For example, at the time of transmitting a data frame that requests an acknowledgment response frame, a first timer (for example, a retransmission timer for a data frame) that limits the retransmission period of the frame is activated, and, if the acknowledgement response frame to the data frame is not received before the expiration of the first timer (that is, before a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, it is stopped every time the frame is newly received from the wireless communication device of the connection partner, and it is reactivated from the initial value. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received before the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although it is identical to that used in the former case as second timer, a different timer may be also used.

[3] Access Scheme of Wireless LAN System

For example, there is a wireless LAN system which is assumed to communicate or compete with a plurality of wireless communication devices. CSMA/CA is set as the basis of an access scheme in the IEEE802.11 (including an expansion standard or the like) wireless LAN. In a scheme in which transmission by a certain wireless communication device is detected and transmission is performed after a fixed time from the transmission end, simultaneous transmission is performed in the plurality of wireless communication devices that detect the transmission by the wireless communication device, and, as a result, radio signals collide and frame transmission fails. By detecting the transmission by the certain wireless communication device and waiting for a random time from the transmission end, transmission by the plurality of wireless communication devices that detect the transmission by the wireless communication device is stochastically distributed. Therefore, if the number of wireless communication devices assigned the earliest time out of a random of times is one, frame transmission by the wireless communication device succeeds and frame collision can be prevented. Since the acquisition of the transmission right based on the random value becomes impartial between the plurality of wireless communication devices, it can be said that a scheme adopting Carrier Avoidance is a suitable scheme to share a wireless medium between the plurality of wireless communication devices.

[4] Interframe Space of Wireless LAN

The interframe space of the IEEE802.11 wireless LAN is described. There are six types of interframe spaces used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the interframe space is defined as a continuous period that should confirm and open the idle carrier sense before transmission in the IEEE802.11 wireless LAN, and a strict period from a previous frame is not discussed. Therefore, the above defined definition is adhered to through the explanation of the IEEE802.11 wireless LAN system. In the IEEE802.11 wireless LAN, a waiting time at the time of random access based on CSMA/CA is assumed to be the sum of a fixed time and a random time, and it can be said that such a definition intends to clarify the fixed time.

DIFS and AIFS are interframe spaces used when attempting the frame exchange start in a contention period that competes with other wireless communication devices based on CSMA/CA. DIFS is used in a case where the right of priority according to the traffic type is not distinguished, AIFS is used in a case where the right of priority by traffic identifier (TID) is provided.

Since DIFS and AIFS are used in similar operation, AIFS is chiefly used to give the explanation below. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified by priority at the time of access on the basis of the traffic type. The class at the time of this access is referred to as "access category (AC)". Therefore, the value of AIFS is provided in every access category.

PIFS is an interframe space to enable an access more preferential than that of other competing wireless communication devices, and the period is shorter than the values of DIFS and AIFS. SIFS is an interframe space which can be used in a case where frame exchange continues in a burst manner at the time of transmission of a control frame of a response system or once the access right is acquired. EIFS is an interframe space caused when frame reception fails.

RIFS is an interframe space which can be used in a case where a plurality of frames are continuously transmitted to the same wireless communication device in a burst manner once the access right is acquired, and a response frame from a wireless communication device of the transmission partner is not requested while RIFS is used.

Figure 22:
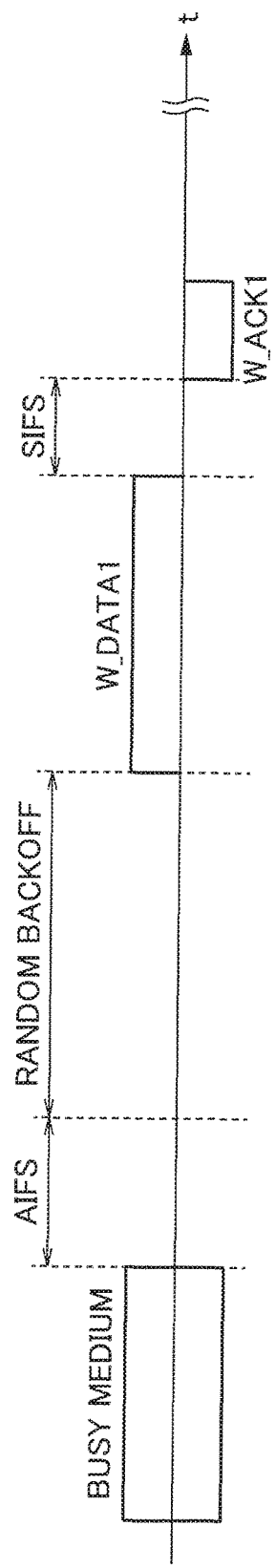
FIG. 22 is a diagram illustrating an example of frame exchanging during a contention period according to an eighteenth embodiment.

Here, FIG. 22 illustrates one example of frame exchange in a competitive period based on the random access in the IEEE802.11 wireless LAN.

When a transmission request of a data frame (W_DATA1) is generated in a certain wireless communication device, it is assumed that it is recognized that a medium is busy (busy medium) as a result of carrier sense. In this case, AIFS of a fixed time is set from the time point at which the carrier sense becomes idle, and, when a random time (random backoff) is set afterward, data frame W_DATA1 is transmitted to the communicating partner.

The random time is acquired by multiplying a slot time by a pseudorandom integer derived from the uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values for every access category. In a wireless communication device of transmission destination of W_DATA1, when reception of the data frame succeeds, a response frame (W_ACK1) is transmitted after SIFS from the reception end time point. If W_ACK1 is received within a transmission burst time limit, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined for every physical layer. Moreover, although parameters to which the value of each access category such as AIGS, CWmin and CWmax is set can be set every communication group (which is a basic service set (BSS) in the IEEE802.11 wireless LAN), the default values are defined.

For example, in the definition of 802.11ac, with an assumption that SIFS is 16 μs and the slot time is 9 μs, and thereby PIFS is 25 μs and DIFS is 34 μs, the default value of the interframe space of an access category of BACKGROUND (AC_BK) in AIFS is 79 μs, the default value of the interframe space of BEST EFFORT (AC_BE) is 43 μs, the default value of the interframe space between VIDEO (AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of the time lengths of response frames in a case where SIFS and DIFS are transmitted at the lowest obligatory physical rate. In the present embodiment, a wireless communication system using parameters at such interframe spaces is assumed to be an interfering system with a wide communication range.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "memory" may encompass any electronic component which can store electronic information. The "memory" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic or optical data storage, which are readable by a processor. It can be said that the memory electronically communicates with a processor if the processor read and/or write information for the memory. The memory may be integrated to a processor and also in this case, it can be said that the memory electronically communication with the processor.

In the above embodiments, a plurality of frames such as data frames transmitted by the plurality of terminals may be the same or may be different. Generally, when it is expressed that the plurality of terminals transmits or the access point receives a plurality of X-th frames, the X-th frames may be the same or may be different.

Note that the frames described in the embodiments may indicate not only things called frames in, for example, the IEEE 802.11 standard, but also things called packets.

All of functions or a part of the functions in the above embodiments may be implemented by software processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. A wireless communication device comprising:
a transmitter configured to multiplex and transmit a plurality of first frames;
a receiver configured to receive a plurality of second frames that represent acknowledgement responses to the plurality of first frames and are multiplexed and transmitted; and
controlling circuitry, wherein
first information necessary for transmission of the plurality of second frames is set in the plurality of first frames, and
the controlling circuitry is configured to separate the plurality of second frames based on the first information, wherein
the plurality of second frames are transmitted in spatial multiplexing,
the first information is information necessary to separate the plurality of second frames transmitted in the spatial multiplexing, and
the first information contains information specifying preamble patterns to be disposed in the plurality of second frames.
2. The wireless communication device according to claim 1, wherein the first information contains information to correct timings to transmit the plurality of second frames.

3. The wireless communication device according to claim 1, wherein the first information contains information to determine a transmission power for the plurality of second frames.

4. The wireless communication device according to claim 1, wherein the first information contains information on values to correct frequencies at which the plurality of second frames are transmitted.

5. The wireless communication device according to claim 1, comprising at least one antenna.

6. A wireless communication device comprising:
a transmitter configured to transmit a frame to which first information is set, and to multiplex and transmit a plurality of first frames;
a receiver configured to receive a plurality of second frames that represent acknowledgement responses to the plurality of first frames and are multiplexed and transmitted; and
controlling circuitry, wherein
the first information is information necessary for transmission of
the plurality of second frames, and
the controlling circuitry is configured to separate the plurality of second frames based on the first information, wherein
the plurality of second frames are transmitted in spatial multiplexing,
the first information is information necessary to separate the plurality of second frames transmitted in the spatial multiplexing, and
the first information contains information specifying preamble patterns to be disposed in the plurality of second frames.

7. The wireless communication device according to claim 6, comprising at least one antenna.

8. A wireless communication device comprising:
a receiver configured to receive a first frame multiplexed with another first frame and transmitted;
a transmitter configured to transmit a second frame representing an acknowledgement response to the first frame; and
controlling circuitry, wherein
the first frame contains first information necessary to multiplex the second frame with another second frame, and
the controlling circuitry is configured to generate the second frame based on the first information, wherein
the second frame is transmitted with the other second frame in spatial multiplexing,
the first information is information necessary to separate the second frame and the other second frame transmitted in the spatial multiplexing, and
the first information is information specifying preamble patterns to be disposed in the second frame.

9. The wireless communication device according to claim 8, wherein
the first information contains information to correct a timing to transmit the second frame, and
the controlling is configured to control a timing to transmit the second frame based on the first information.

10. The wireless communication device according to claim 8, wherein
the first information contains information to determine a transmission power for the second frame, and
the controlling circuitry is configured to control a transmission power for the second frame based on the first information.

11. The wireless communication device according to claim 8, wherein
the first information contains information on a value to correct a frequency at which the second frame is transmitted, and
the controlling circuitry is configured to correct, based on the first information, the frequency at which the second frame is transmitted.

12. The wireless communication device according to claim 8, comprising at least one antenna.

13. A wireless communication device comprising:
a receiver configured to receive a frame in which first information is set, and to receive a first frame multiplexed with another first frame and transmitted; and
a transmitter configured to transmit a second frame representing an acknowledgement response to the first frame, wherein
the first information is information necessary to multiplex the second frame with another second frame, and
the controlling circuitry is configured to generate the second frames based on the first information, wherein
the second frame is transmitted with the other second frame in spatial multiplexing,
the first information is information necessary to separate the second frame and the other second frame transmitted in the spatial multiplexing, and
the first information is information specifying preamble patterns to be disposed in the second frame.

14. The wireless communication device according to claim 13, comprising at least one antenna.

* * * * *